United States Patent
Fan et al.

(10) Patent No.: US 11,601,248 B2
(45) Date of Patent: Mar. 7, 2023

(54) COMMUNICATION METHOD AND COMMUNICATIONS APPARATUS

(71) Applicant: HUAWEI TECHNOLOGIES CO., LTD., Guangdong (CN)

(72) Inventors: Qiang Fan, Hefei (CN); Chong Lou, Shanghai (CN); Xing Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 143 days.

(21) Appl. No.: 17/094,263

(22) Filed: Nov. 10, 2020

(65) Prior Publication Data

US 2021/0084650 A1 Mar. 18, 2021

Related U.S. Application Data

(63) Continuation of application No. PCT/CN2019/083745, filed on Apr. 22, 2019.

(30) Foreign Application Priority Data

May 11, 2018 (CN) .......................... 201810450812.4

(51) Int. Cl.
*H04L 5/00* (2006.01)
*H04W 72/04* (2009.01)
*H04W 72/0453* (2023.01)

(52) U.S. Cl.
CPC ............ *H04L 5/0053* (2013.01); *H04L 5/001* (2013.01); *H04L 5/0094* (2013.01);
(Continued)

(58) Field of Classification Search
CPC ..... H04L 5/001; H04L 5/0053; H04L 5/0094; H04W 72/042; H04W 72/0453
See application file for complete search history.

(56) References Cited

U.S. PATENT DOCUMENTS

| 2012/0044894 A1 | 2/2012 | Ko et al. |
| 2013/0250881 A1 | 9/2013 | Liao et al. |

(Continued)

FOREIGN PATENT DOCUMENTS

| CN | 101005308 A | 7/2007 |
| CN | 103986566 A | 8/2014 |

(Continued)

OTHER PUBLICATIONS

Oppo, Remaining issues on bandwidth part configuration and activation. 3GPP TSG RAN WG1 Meeting 90bis, Prague, CZ, Oct. 9 13, 2017, R1-1718050, 4 pages.

(Continued)

*Primary Examiner* — Kevin C. Harper
(74) *Attorney, Agent, or Firm* — Womble Bond Dickinson (US) LLP

(57) ABSTRACT

This application provides a communication method and a communications apparatus. The method includes: receiving, by a terminal device, a configuration message from a network device, where the configuration message is used to configure a plurality of uplink BWPs and a plurality of downlink BWPs; determining, by the terminal device, a first BWP in the plurality of uplink BWPs, where the first BWP is used to transmit feedback information of downlink information that is on a second BWP, and the second BWP is any one of the plurality of downlink BWPs; receiving, by the terminal device, the downlink information on the second BWP; and sending, by the terminal device, the feedback information of the downlink information by using the first BWP, so that a BWP on which the feedback information is sent can be determined in a scenario in which a plurality of BWPs are activated.

20 Claims, 7 Drawing Sheets

(52) U.S. Cl.
CPC ......... *H04L 5/0098* (2013.01); *H04W 72/042* (2013.01); *H04W 72/0453* (2013.01); *H04L 5/0055* (2013.01)

(56) References Cited

U.S. PATENT DOCUMENTS

| | | |
|---|---|---|
| 2016/0119912 A1 | 4/2016 | Terry et al. |
| 2019/0045533 A1* | 2/2019 | Chatterjee ............. H04L 5/0094 |
| 2019/0141742 A1* | 5/2019 | Zhou ...................... H04L 5/0057 |
| 2019/0223227 A1* | 7/2019 | Jiang ................. H04W 74/0833 |
| 2020/0213066 A1* | 7/2020 | Ma ........................ H04L 5/0092 |
| 2021/0058197 A1* | 2/2021 | Gao ...................... H04L 5/1469 |

FOREIGN PATENT DOCUMENTS

| | | |
|---|---|---|
| CN | 106851744 A | 6/2017 |
| WO | 2018027938 A1 | 2/2018 |
| WO | 2018027997 A1 | 2/2018 |
| WO | 2018084544 A1 | 5/2018 |

OTHER PUBLICATIONS

MediaTek Inc., Summary of Bandwidth Part Remaining Issues. 3GPP TSG RAN WG1 Meeting AH 1801, Vancouver, Canda, Jan. 22 26, 2018, R1-1801158, 21 pages.

Ericsson, BWP and random access. 3GPP TSG-RAN WG1 91, Reno, USA, Nov. 27 Dec. 1, 2017, R1-1721425, 3 pages.

Huawei, HiSilicon, Summary of remaining issues on bandwidth pad and wideband operation. 3GPP TSG RAN WG1 Meeting #92, Athens, Greece, Feb. 26 Mar. 2, 2018, R1-1801347, 13 pages.

\* cited by examiner

COMMUNICATION METHOD AND COMMUNICATIONS APPARATUS

CROSS-REFERENCE TO RELATED APPLICATIONS

This application is a continuation of International Application No. PCT/CN2019/083745, filed on Apr. 22, 2019, which claims priority to Chinese Patent Application No. 201810450812.4, filed on May 11, 2018. The disclosures of the aforementioned applications are hereby incorporated by reference in their entireties.

TECHNICAL FIELD

This application relates to the field of communications, and more specifically, to a communication method and a communications apparatus.

BACKGROUND

A 5G communications system may support a carrier with a bandwidth of up to 400 MHz. To reduce a requirement on a bandwidth capability of a terminal device and reduce energy consumption of the terminal device, a concept of a bandwidth part (BWP) is proposed in 5G. The BWP supports the terminal device in performing data transmission and related operations on a bandwidth part of a wide carrier.

To improve a throughput of the terminal device, carrier aggregation (CA) is introduced into long term evolution (LTE). To be specific, in addition to a primary cell (PCell), a base station may further configure a plurality of secondary cells (SCell) for the terminal device. The PCell includes one downlink carrier and one uplink carrier. Each secondary cell includes one downlink carrier and a maximum of one uplink carrier. A cell in which the terminal device that initially accesses the base station is referred to as the primary cell (Pcell). The terminal device feeds back a transport block decoding result to the base station through a physical uplink control channel (PUCCH) on the uplink carrier. A feedback process is referred to as a hybrid automatic repeat request (HARQ) feedback.

In an existing HARQ feedback solution, only one of a plurality of BWPs configured on one carrier is in an active state, so when a cell whose uplink carrier is used to perform a HARQ feedback corresponding to PDSCH transmission is determined, an uplink BWP whose PUCCH resource is used to transmit the HARQ feedback may be determined. However, if concurrency of data of a plurality of different service types (for example, ultra reliable & low latency communication (URLLC) data and enhanced mobile broadband (eMBB) data) is supported on one carrier, a plurality of BWPs may be simultaneously activated on one carrier. In a scenario in which the plurality of BWPs are activated, the plurality of activated BWPs are supported on one uplink carrier. However, in the prior art, a BWP used to transmit the HARQ feedback cannot be determined.

SUMMARY

In view of this, embodiments of this application provide a data transmission method, a network device, and a terminal device, to determine an uplink BWP whose PUCCH resource is used to transmit a HARQ feedback.

According to a first aspect, a communication method is provided. The method includes: receiving, by a terminal device, a configuration message from a network device, where the configuration message is used to configure a plurality of uplink BWPs and a plurality of downlink BWPs; determining, by the terminal device, a first BWP in the plurality of uplink BWPs, where the first BWP is used to transmit feedback information of downlink information that is on a second BWP, and the second BWP is any one of the plurality of downlink BWPs; receiving, by the terminal device, the downlink information on the second BWP; and sending, by the terminal device, the feedback information of the downlink information by using the first BWP.

The terminal device receives the configuration message sent by the network device, to obtain the plurality of uplink BWPs, and determines the first BWP in the plurality of uplink BWPs. After receiving the downlink information of the second BWP, the terminal device may transmit the feedback information of the downlink information by using the first BWP. In other words, the terminal device may know an uplink BWP whose PUCCH resource is used to transmit the feedback information.

In one embodiment, the method further includes:
receiving, by the terminal device, indication information from the network device, where the indication information is used to indicate the first BWP; and
the determining, by the terminal device, a first BWP in the plurality of uplink BWPs includes: determining, by the terminal device, the first BWP based on the indication information.

In one embodiment, the indication information may be downlink control information (DCI). The terminal device may determine the first BWP based on an indication of the DCI.

In one embodiment, the indication information further includes a carrier index, and the carrier index is used to indicate a carrier on which the first BWP is located.

If there are a plurality of carriers, the terminal device may determine, based on the carrier index indicated in the DCI, the carrier on which the first BWP is located, to obtain the first BWP.

In one embodiment, the indication information further includes cell information, and the cell information is used to indicate a cell to which the carrier belongs.

If the network device configures a plurality of cells for the terminal device, the terminal device may obtain, based on the cell information indicated in the DCI, the cell to which the first BWP belongs, thereby obtaining the first BWP.

In one embodiment, the configuration message includes a correspondence between the first BWP and the second BWP, and the determining, by the terminal device, a first BWP in the plurality of uplink BWPs includes:
determining, by the terminal device, the first BWP based on the correspondence.

In one embodiment, the configuration message may be radio resource control (RRC) signaling.

The terminal device may learn, via the RRC signaling, that the feedback information of the downlink information on the second BWP needs to be sent on the first BWP.

In one embodiment, the determining, by the terminal device, a first BWP in the plurality of uplink BWPs includes:
determining, by the terminal device, the first BWP based on a correspondence between the first BWP and the second BWP, where the correspondence is preset in the terminal device.

The terminal device may learn, based on the correspondence preset in a protocol, that the feedback information of the downlink information on the second BWP needs to be sent on the first BWP.

In one embodiment, the configuration message includes a carrier index, and the carrier index is used to indicate a carrier on which the first BWP is located.

In one embodiment, the configuration message further includes cell information, and the cell information is used to indicate a cell to which the carrier belongs.

If the configuration message is the RRC signaling, and the indication information is the DCI, the terminal device may obtain the first BWP via the DCI, and obtain, via the RRC signaling, the carrier on which the first BWP is located. Further, the terminal device may obtain, via the RRC signaling, the cell to which the carrier, on which the first BWP is located, belongs.

In one embodiment, before the sending, by the terminal device, the feedback information of the downlink information by using the first BWP, the method further includes:

activating, by the terminal device, the first BWP.

If the first BWP is used to send the feedback information, it needs to be ensured that the first BWP is in an active state. Herein, the terminal device may activate the first BWP.

In one embodiment, the method further includes:

receiving, by the terminal device, an activation indication from the network device, where the activation indication is used to indicate to activate the first BWP; and the activating, by the terminal device, the first BWP includes:

activating, by the terminal device, the first BWP based on the activation indication.

The terminal device may alternatively activate the first BWP based on an activation command from the network device.

In one embodiment, the method further includes:

receiving, by the terminal device, a HARQ process parameter from the network device; and determining, by the terminal device based on the HARQ process parameter, a HARQ process number corresponding to the feedback information.

In one embodiment, the HARQ process parameter may be carried in the RRC signaling.

The terminal device may obtain the HARQ process number through calculation based on the HARQ process parameter carried in the RRC signaling, to avoid mutual impact between configuration resources during usage.

In one embodiment, the method further includes:

determining, by the terminal device based on a predefined process parameter, a HARQ process number corresponding to the feedback information.

In one embodiment, the predefined process parameter may be stored in the terminal device.

The terminal device may obtain the HARQ process number through calculation based on the process parameter predefined in a protocol, to avoid mutual impact between configuration resources during usage.

According to a second aspect, a communication method is provided. The method includes: sending, by a network device, a configuration message to a terminal device, where the configuration message is used to configure a plurality of uplink BWPs and a plurality of downlink BWPs; sending, by the network device, downlink information to the terminal device by using a second BWP, where the second BWP is any one of the plurality of downlink BWPs; and receiving, by the network device, feedback information that is of the downlink information and that is sent by the terminal device by using a first BWP, where the first BWP is a BWP in the plurality of uplink BWPs.

The network device sends the configuration message to the terminal device, so that the terminal device may determine the first BWP in the plurality of uplink BWPs, and the terminal device transmits the feedback information of the downlink information by using the first BWP. In other words, the terminal device may know an uplink BWP whose PUCCH resource is used to transmit the feedback information.

In one embodiment, the method further includes: sending, by the network device, indication information to the terminal device, where the indication information is used to indicate the first BWP.

In one embodiment, the indication information may be downlink control information (DCI). The network device may indicate the first BWP to the terminal device by using the DCI.

In one embodiment, the indication information further includes a carrier index, and the carrier index is used to indicate a carrier on which the first BWP is located.

In one embodiment, the indication information further includes cell information, and the cell information is used to indicate a cell to which the carrier belongs.

In one embodiment, the configuration message includes a correspondence between the first BWP and the second BWP, and the correspondence is used by the terminal device to determine the first BWP.

In one embodiment, the configuration message includes a carrier index, and the carrier index is used to indicate a carrier on which the first BWP is located.

In one embodiment, the configuration message further includes cell information, and the cell information is used to indicate a cell to which the carrier belongs.

In one embodiment, the method further includes:

sending, by the network device, an activation indication to the terminal device, where the activation indication is used to indicate the terminal device to activate the first BWP.

The network device sends the activation indication to the terminal device, so that the terminal device activates the first BWP.

In one embodiment, the method further includes:

sending, by the network device, a HARQ process parameter to the terminal device, where the HARQ process parameter is used by the terminal device to determine a HARQ process number corresponding to the feedback information.

According to a third aspect, a communication method is provided. The method includes: determining, by a terminal device, a first BWP combination, where the first BWP combination includes an uplink BWP and a downlink BWP; and performing, by the terminal device, random access by using the uplink BWP and the downlink BWP.

In a scenario in which a plurality of BWPs are activated, the terminal device may select, from the activated BWPs, an appropriate uplink BWP and downlink BWP to perform random access.

In one embodiment, the uplink BWP and the downlink BWP that are in the first BWP combination are in an active state, and the uplink BWP and the downlink BWP that are in the first BWP combination are configured with an association relationship.

The terminal device determines the first BWP combination in a plurality of manners. For example, the terminal device may first determine whether there is an activated uplink BWP. If an uplink BWP is activated, the terminal device continues to determine whether a downlink BWP associated with the uplink BWP is activated. If the downlink BWP associated with the uplink BWP is also in an active state, the terminal device may select a combination of the uplink BWP and the downlink BWP to perform random access.

In one embodiment, when there is no BWP combination in which both an uplink BWP and a downlink BWP are in an active state and are configured with an association relationship, the method further includes:

selecting, by the terminal device, a first uplink BWP configured with an access resource, where the first uplink BWP is in the active state; and activating, by the terminal device, a first downlink BWP corresponding to the first uplink BWP.

The access resource refers to a physical random access channel (PRACH) resource.

In one embodiment, if there are a plurality of activated first uplink BWPs, the method further includes:

randomly selecting, from the plurality of activated first uplink BWPs, one uplink BWP as the uplink BWP of the first BWP combination; or selecting the uplink BWP in the first BWP combination based on a BWP index, where the uplink BWP in the first BWP combination has a largest or smallest BWP index in the plurality of activated first uplink BWPs.

In one embodiment, the determining, by a terminal device, a first BWP combination includes:

selecting, by the terminal device, the first BWP combination based on a degree of density of access resource configuration on each of a plurality of BWP combinations.

According to a fourth aspect, a communications apparatus is provided. The communications apparatus may be an apparatus applied to a terminal device, or may be a chip or a circuit, and is configured to perform the method according to the first aspect or any possible implementation of the first aspect. Specifically, the communications apparatus may be implemented by hardware, or may be implemented by hardware executing corresponding software.

In one embodiment, the communications apparatus includes modules configured to perform the method according to the first aspect or any possible implementation of the first aspect.

In one embodiment, the communications apparatus includes a processor and a memory. The memory is configured to store an instruction. When the communications apparatus runs, the processor executes the instruction stored in the memory, so that the communications apparatus performs the communication method according to the first aspect or any implementation of the first aspect. It should be noted that the memory may be integrated into the processor, or may be independent of the processor.

In one embodiment, the communications apparatus includes a processor. The processor is configured to be coupled to a memory, read an instruction in the memory, and perform, based on the instruction, the data sending method according to the first aspect or any implementation of the first aspect.

According to a fifth aspect, a communications apparatus is provided. The communications apparatus is a network device, or may be a chip or a circuit, and is configured to perform the method according to the second aspect or any possible implementation of the second aspect. Specifically, the communications apparatus may be implemented by hardware, or may be implemented by hardware executing corresponding software.

In one embodiment, the communications apparatus includes modules configured to perform the method according to the second aspect or any possible implementation of the second aspect.

In one embodiment, the communications apparatus includes a processor and a memory. The memory is configured to store an instruction. When the communications apparatus runs, the processor executes the instruction stored in the memory, so that the communications apparatus performs the communication method according to the second aspect or any implementation of the second aspect. It should be noted that the memory may be integrated into the processor, or may be independent of the processor.

In one embodiment, the communications apparatus includes a processor. The processor is configured to be coupled to a memory, read an instruction in the memory, and perform, based on the instruction, the data sending method according to the second aspect or any implementation of the second aspect.

According to a sixth aspect, a communications apparatus is provided. The communications apparatus may be an apparatus applied to a terminal device, or may be a chip or a circuit, and is configured to perform the method according to the third or any possible implementation of the third aspect. Specifically, the communications apparatus may be implemented by hardware, or may be implemented by hardware executing corresponding software.

In one embodiment, the communications apparatus includes modules configured to perform the method according to the third aspect or any possible implementation of the third aspect.

In one embodiment, the communications apparatus includes a processor and a memory. The memory is configured to store an instruction. When the communications apparatus runs, the processor executes the instruction stored in the memory, so that the communications apparatus performs the communication method according to the third aspect or any implementation of the third aspect. It should be noted that the memory may be integrated into the processor, or may be independent of the processor.

In one embodiment, the communications apparatus includes a processor. The processor is configured to be coupled to a memory, read an instruction in the memory, and perform, based on the instruction, the data sending method according to the third aspect or any implementation of the third aspect.

According to a seventh aspect, a computer-readable storage medium is provided. The computer-readable storage medium stores a program, and the program enables a communications apparatus to perform any communication method according to any one of the foregoing aspects and the implementations of the foregoing aspects.

According to an eighth aspect, this application further provides a computer program product including an instruction. When the computer program product runs on a computer, the computer is enabled to perform any communication method according to the foregoing aspects.

According to a ninth aspect, this application further provides a system. The system includes a terminal device. The terminal device may be configured to perform the operations performed by the terminal device in the first aspect and any method of the first aspect.

In one embodiment, the system may further include a network device. The network device may be configured to perform the operations performed by the network device in the second aspect and any method in the second aspect.

In one embodiment, the system may further include another device that interacts with the terminal device and/or network device in the embodiments of this application, and the like.

According to a tenth aspect, this application further provides a system. The system includes a terminal device. The terminal device may be configured to perform the operations performed by the terminal device in the third aspect and any method of the third aspect.

In one embodiment, the system may further include a network device.

In one embodiment, the system may further include another device that interacts with the terminal device and/or network device in the embodiments of this application, and the like.

According to an eleventh aspect, a chip system is provided. The system includes a processor, where the processor is connected to a memory, and the processor is configured to: invoke a computer program from the memory and run the computer program, so that a communications device on which the chip system is installed performs any method in any one of the foregoing aspects and possible implementations of the foregoing aspects. The memory may be located inside the chip system, or may be located outside the chip system.

According to a twelfth aspect, a terminal device is provided. The terminal device includes the communications apparatus described in the fourth aspect or the sixth aspect.

DESCRIPTION OF EMBODIMENTS

The following describes technical solutions of this application with reference to the accompanying drawings.

The following describes some terms in this application, to facilitate understanding of a person skilled in the art.

(1) A terminal is also referred to as user equipment (UE), a mobile station (MS), a mobile terminal (MT), or the like, and is a device that provides a user with voice and/or data connectivity, for example, a handheld device or a vehicle-mounted device that has a wireless connection function. Currently, for example, the terminal is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, or the like.

(2) A network device is a device in a wireless network, for example, is a radio access network (RAN) node that enables a terminal to access the wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home eNodeB (for example, a home evolved NodeB or a home Node B, HNB), a baseband unit (BBU), or a wireless fidelity (Wife) access point (AP). In a network structure, the network device may include a centralized unit (CU) node, a distributed unit (DU) node, or a RAN device that includes a CU node and a DU node.

(3) "A plurality of" indicates two or more, and another quantifier is similar to this. The term "and/or" describes an association relationship for describing associated objects and represents that three relationships may exist. For example, A and/or B may represent the following three cases: Only A exists, both A and B exist, and only B exists.

Figure 1:
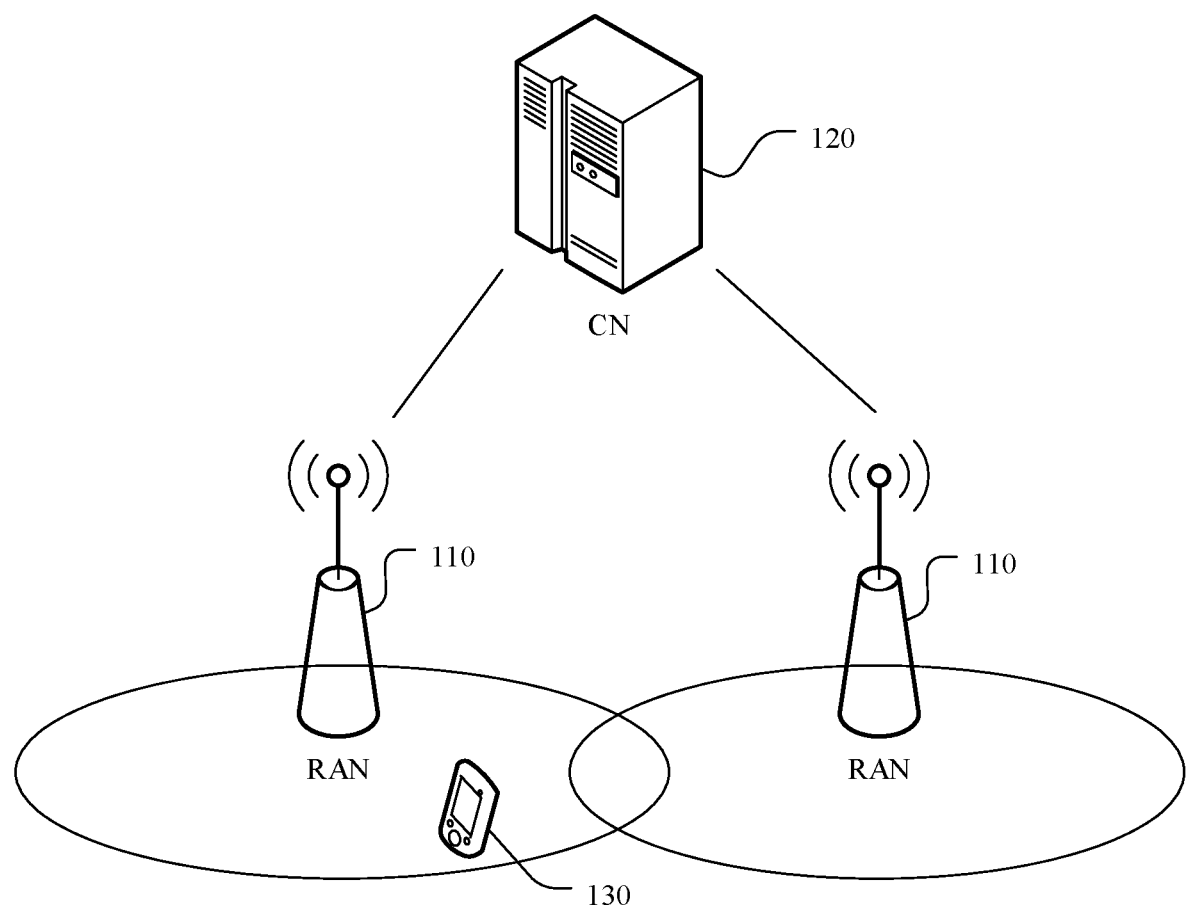
FIG. 1 is a schematic diagram of an application scenario according to this application.

FIG. 1 is a schematic diagram of an application scenario according to this application. As shown in FIG. 1, a terminal 130 accesses a wireless network, to obtain a service from an external network (for example, the internet) over the wireless network or communicate with another terminal over the wireless network. The wireless network includes a RAN 110 and a core network (CN) 120. The RAN 110 is used to connect the terminal 130 to the wireless network, and the CN 120 is used to manage the terminal and provide a gateway for communicating with the external network.

In the 5G NR standard, in a scenario in which a plurality of BWPs are activated, a plurality of activated uplink (UL) BWPs are supported on one uplink carrier. In the prior art, an uplink BWP whose physical uplink control channel (PUCCH) resource is used to transmit a hybrid automatic repeat request (HARQ) feedback corresponding to PDSCH transmission cannot be determined.

Figure 2:
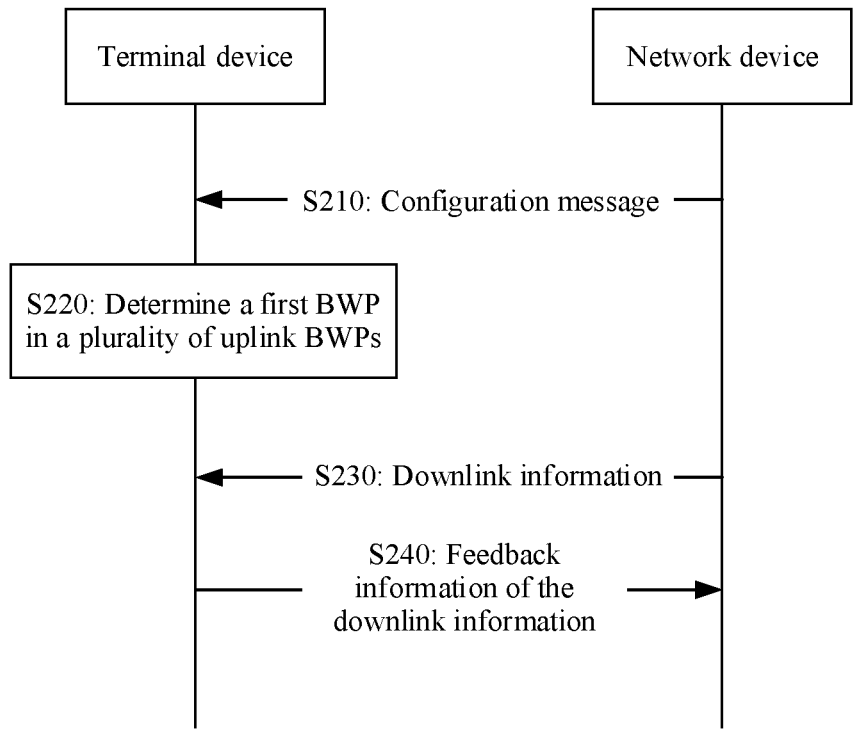
FIG. 2 is a schematic flowchart of a communication method according to an embodiment of this application.

FIG. 2 is a schematic flowchart of a communication method 200 according to an embodiment of this application. In one embodiment, the terminal device in FIG. 2 may be the terminal 130 in FIG. 1, and a network device may be the RAN 110 in FIG. 1. As shown in FIG. 2, the method 200 includes the following operations.

S210: The network device sends a configuration message to the terminal device, where the configuration message is used to configure a plurality of uplink BWPs and a plurality of downlink BWPs. Correspondingly, the terminal device receives the configuration message from the network device.

The configuration message may include other information configured by the network device for the terminal device, for example, an index corresponding to each uplink BWP or downlink BWP, information of a carrier on which each uplink BWP or downlink BWP is located, or information of a cell to which a carrier, on which each uplink BWP or downlink BWP is located, belongs. This is not limited. The terminal device may obtain the plurality of uplink BWPs and the plurality of downlink BWPs based on the configuration message.

It should be understood that content included in the configuration message may be determined based on an actual application scenario.

In one embodiment, the configuration message may be radio resource control (RRC) signaling.

S220: The terminal device determines a first BWP in the plurality of uplink BWPs, where the first BWP is used to transmit feedback information of downlink information that is on a second BWP, and the second BWP is any one of the plurality of downlink BWPs.

In other words, after obtaining the configuration message, the terminal device may determine the first BWP in the plurality of uplink BWPs based on the configuration message. If all the plurality of uplink BWPs are in an active state, the terminal device may select, based on indication information and/or the configuration message, one BWP to transmit the feedback information of the downlink information that is on the second BWP. The indication information may be downlink control information (DCI).

In one embodiment, a cell to which the first BWP belongs may be a primary cell PCell, where the first BWP is a BWP belongs to the primary cell. In one embodiment, the cell to which the first BWP belongs may alternatively be a secondary cell SCell, where the first BWP is a BWP belongs to the secondary cell SCell.

The network device sends the downlink information to the terminal device by using the second BWP.

Correspondingly, in S230, the terminal device receives the downlink information on the second BWP.

Specifically, after receiving the downlink information on the second BWP, the terminal device may perform decoding processing on the received data. The terminal device needs to feed back a decoding result of the data or a transport block (TB) (to be specific, whether decoding succeeds or fails) to the network device.

S240: The terminal device sends the feedback information of the downlink information by using the first BWP.

In one embodiment, the feedback information may be a hybrid automatic repeat request (HARQ) feedback. For example, the terminal device transmits the HARQ feedback to the network device by using the first BWP.

It should be noted that, when the terminal device transmits the HARQ feedback by using the first BWP, the first BWP needs to be in the active state. In this embodiment of this application, the first BWP may be ensured to be in the active state in a plurality of manners.

In one embodiment, before S240, the method 200 further includes:

activating, by the terminal device, the first BWP.

In other words, when the terminal device determines that the HARQ feedback needs to be performed on the first BWP, if the first BWP is not activated, the terminal device may activate the first BWP, or if the first BWP is in the active state, the terminal device may directly transmit the HARQ feedback by using the first BWP.

In one embodiment, the terminal device may also activate the first BWP based on an indication of the network device. Specifically, for example, the network device sends an activation indication to the terminal device, where the activation indication is used to indicate to activate the first BWP. Correspondingly, the terminal device receives the activation indication, and activates the first BWP based on the activation indication.

In one embodiment, the activation indication may be carried in the DCI or a medium access control control element (MAC CE). This is not limited.

In this embodiment of this application, the terminal device receives the configuration message sent by the network device, where the configuration message is used to configure the plurality of uplink BWPs and the plurality of downlink BWPs; and then determines the first BWP in the plurality of uplink BWPs, where the first BWP is used to transmit the feedback information of the downlink information that is on the second BWP, and the second BWP is any one of the plurality of downlink BWPs; and transmits the HARQ feedback by using the first BWP. In this way, in a scenario in which a plurality of BWPs are activated, the terminal device can know a BWP on which the HARQ feedback is performed.

The following describes in detail, with reference to an indication manner and/or a representation form of the first BWP (including one or more of information (identification information such as an index and an ID) about the first BWP, the carrier on which the first BWP is located, the cell to which the carrier, on which the first BWP is located, belongs, and a correspondence between the first BWP and the second BWP), various implementations of determining the first BWP by the terminal device.

In a first optional implementation, the method 200 further includes:

receiving, by the terminal device, the indication information from the network device, where the indication information is used to indicate the first BWP.

S220 includes: determining, by the terminal device, the first BWP based on the indication information.

In one embodiment, the indication information may be carried in the downlink control information (DCI).

In one embodiment, the indication information may indicate information having an identification function, such as a BWP number, a BWP ID, or a BWP index of the first BWP. This is not specifically limited.

In other words, the indication information may include only information about the first BWP. For example, if the network device configures only the PCell for the terminal device, and only one uplink carrier is configured on the PCell, the indication information does not need to carry information about the cell to which the first BWP belongs and information about the uplink carrier on which the first BWP is located.

In one embodiment, the indication information may further include cell information. For example, if a cell configured by the network device is not configured with a supplementary uplink (SUL) carrier, the indication information does not need to carry the information about the uplink carrier on which the first BWP is located. Specifically, the indication information may further carry the cell information, and the cell information is used to indicate a cell to which the carrier belongs. The purpose of introducing the cell information herein is to determine the cell to which the uplink carrier, on which the first BWP is located, belongs. Because the network device may configure a plurality of secondary cells SCells for the terminal device, the cell, to which the carrier on which the first BWP is located, belongs needs to be determined. In one embodiment, the cell information may further be carried in the configuration message. To be specific, when configuring the plurality of uplink BWPs and the plurality of downlink BWPs for the terminal device, the network device may notify the terminal device of the cell to which the carrier, on which the first BWP is located, belongs.

In one embodiment, the indication information may further include the information about the uplink carrier on which the first BWP is located. For example, the network device configures only the PCell for the terminal device, the PCell is configured with a plurality of uplink carriers, for example, the uplink supplementary uplink (SUL) carrier and a non-SUL carrier, and PUCCH resources are configured for BWPs on the two uplink carriers. In this case, the indication information does not need to carry the information about the cell to which the first BWP belongs, but needs to carry the information about the uplink carrier on which the first BWP is located. The SUL carrier means that the network device uses a 3.5 GHz uplink carrier and a 3.5 GHz downlink carrier in a configured cell. Because transmit power of the network device is high, downlink coverage may be ensured. However, because transmit power of the terminal device is difficult to ensure uplink coverage on a 3.5 GHz spectrum. Therefore, a 1.8 GHz supplementary carrier, that is, the SUL carrier, is introduced, and the uplink coverage is ensured by using the introduced low-frequency carrier. In the scenario, one downlink carrier and two uplink carriers are configured for one cell of the terminal device, and the two uplink carriers are respectively the SUL carrier and the non-SUL carrier. In other words, if there are a plurality of uplink carriers (for example, in a scenario where an SUL carrier is configured), an uplink carrier on which the first BWP is located further needs to be determined. Specifically, the indication information may further carry a carrier index, and the carrier index is used to indicate the uplink carrier on which the first BWP is located. In one embodiment, the carrier index may be information having a function of identifying a carrier, such as an ID, an index, or a number of the uplink carrier.

In conclusion, the indication information may carry the following information combinations: information about the first BWP and the cell information, information about the first BWP and the carrier index, or information about the first BWP, the cell information, and the carrier index. In other words, the information about the first BWP needs to exist, and whether the cell information and the carrier index are required may be determined based on an actual scenario.

In one embodiment, in the first optional implementation, the carrier index may also be carried in the configuration message. To be specific, when configuring the plurality of uplink BWPs and the plurality of downlink BWPs for the terminal device, the network device may notify the terminal device of the carrier on which the first BWP is located.

For ease of understanding, the following uses an example in which the DCI carries the cell information and the information about the BWP for detailed description.

Specifically, the network device adds an uplink cell index (ulCellIndex) field and an uplink bandwidth part index (ulBwpIndex) field to the DCI used for downlink scheduling. The ulCellIndex field is used to indicate that a HARQ feedback corresponding to the PDSCH transmission in the scheduling is fed back on a Cell indicated by the ulCellIndex field. The ulBwpIndex field is used to indicate a UL BWP (for example, the first BWP) that is of the indicated Cell and on which the HARQ feedback corresponding to the PDSCH transmission is fed back. After receiving the DCI, the terminal device may determine, based on the ulCellIndex field and the ulBwpIndex field in the DCI, a cell to which a BWP belongs and the BWP on which the HARQ feedback corresponding to the PDSCH transmission is transmitted. For example, if a ulBWP a, a ulBWP b, a ulBWP c, and a ulBWP d are configured on a PUCCH SCell x (x is a cell number), and the terminal device receives the DCI, where the DCI carries ulCellIndex=x and ulBwpIndex=c, the terminal device may determine that the HARQ feedback corresponding to the PDSCH transmission needs to be transmitted on the UL BWP c of the PUCCH SCell x. Letters a, b, c, and d are index numbers of BWPs. Further, an uplink carrier index ulCarrierIndex field may be added to the DCI, and the ulCarrierIndex field is used to indicate a carrier on which a BWP used to transmit the HARQ feedback corresponding to the PDSCH transmission is located.

Figure 3:
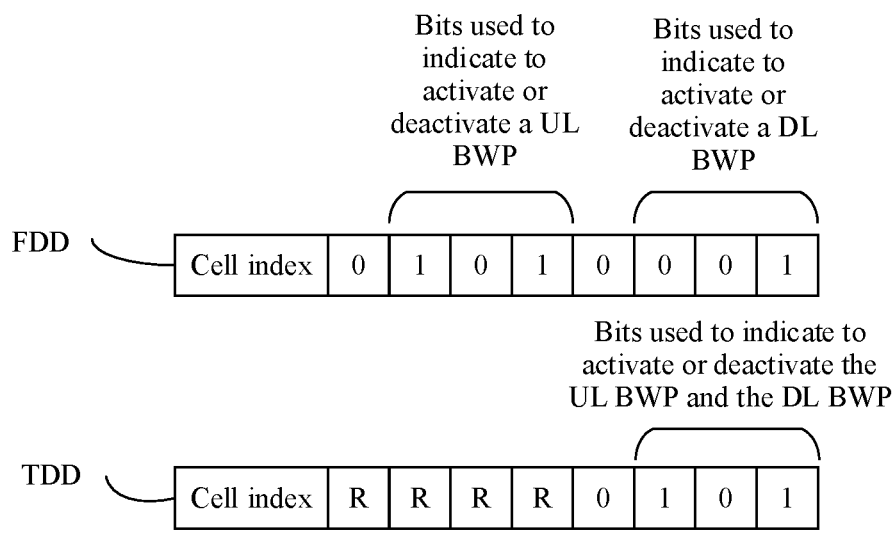
FIG. 3 is a schematic diagram of an example of a format of a BWP activation command according to an embodiment of this application.

In addition, to ensure that a corresponding BWP is in the active state when the terminal device transmits the HARQ feedback, the network device may carry a bitmap indication in the DCI or the MAC CE, and the bitmap indication is used to activate or deactivate an uplink BWP or a downlink BWP. The bitmap used to activate or deactivate the uplink BWP and the bitmap used to activate or deactivate the downlink BWP may be carried in one DCI or in one MAC CE. For ease of understanding, the following provides descriptions with reference to an example of the BWP activation command in FIG. 3. It should be understood that the BWP activation command may be included in the DCI or the MAC CE. This is not specifically limited. FIG. 3 is a schematic diagram of an example of a format of a BWP activation command. The BWP activation command carries a cell index field and a bitmap field, where a cell index indicates a specified cell on which the bitmap field is used to activate/deactivate a BWP. A length of one bitmap is the same as a maximum quantity of UL/DL BWPs that can be configured for one cell. Bits from right to left in the bitmap separately indicate to activate/deactivate a BWP in ascending order of BWP indexes (for example, if a bit is 1, it indicates to activate a corresponding BWP, and if the bit is 0, it indicates to deactivate a corresponding BWP). As shown in FIG. 3, in an FDD mode, the BWP activation command may carry two bitmaps: a bitmap used to indicate to activate or deactivate UL BWPs and a bitmap used to indicate to activate or deactivate DL BWPs. If a network device can configure a maximum of four UL BWPs, and only three UL BWPs are configured for the cell indicated by the cell index, three least significant bits (which are respectively 1, 0, and 1) of a corresponding bitmap are used to indicate to activate or deactivate the UL BWP, and the remaining bit does not indicate any meaning. In one embodiment, three least significant bits (which are respectively 0, 0, and 1) of the bitmap are respectively used to indicate to activate or deactivate the UL BWPs. Alternatively, in a TDD mode, because there is a correspondence between a UL BWP and a DL BWP, that is, one UL BWP and one corresponding DL BWP need to remain in an active state or an inactive state at the same time, the BWP activation command carries only one bitmap. Similarly, the three least significant bits (which are respectively 1, 0, and 1) of the corresponding bitmap are respectively used to indicate to activate or deactivate the UL BWPs and the DL BWPs.

In one embodiment, if a DL BWP activated by a terminal device by using the BWP activation command is a non-default DL BWP, the terminal device may start a timer corresponding to the activated DL BWP, for example, a BWP inactivity timer. When the BWP inactivity timer corresponding to one DL BWP times out, if a default DL BWP is not activated, the terminal device activates the default DL BWP and deactivates the DL BWP. If the default DL BWP is activated, the terminal device only needs to activate the DL BWP.

It should be understood that specific examples in the foregoing implementations are introduced only to help a person skilled in the art understand the technical solutions in the embodiments of this application, and do not constitute a specific limitation on the protection scope of the embodiments of this application.

Therefore, in the foregoing implementations, the network device may explicitly indicate a first BWP in DCI, so that the terminal device can transmit a HARQ feedback on the first BWP.

In a second optional implementation, the configuration message includes a correspondence between the first BWP and the second BWP, and S220 includes:

determining, by the terminal device, the first BWP based on the correspondence.

Specifically, the terminal device may know, based on the correspondence carried in the configuration message, that feedback information of the downlink information on the second BWP needs to be fed back on the first BWP, so that the first BWP is obtained in a plurality of uplink BWPs.

In one embodiment, the configuration message may be RRC signaling, that is, the RRC signaling includes the correspondence. In other words, the terminal device may know, via the RRC signaling, that the feedback information of the downlink information on the second BWP needs to be sent by using the first BWP.

In one embodiment, the configuration message may further carry a carrier index, and the carrier index is used to indicate a carrier on which the first BWP is located. In one embodiment, the configuration message may further carry cell information, and the cell information is used to indicate a cell to which the carrier, on which the first BWP is located, belongs to.

Herein, for a description of a scenario in which the configuration message needs to carry the carrier index and a description of a scenario in which the configuration message needs to carry the cell information, refer to the description in the first optional implementation. Details are not described herein.

For example, the configuration message is RRC signaling. Specifically, when configuring a secondary cell SCell for the terminal device, the network device configures, by using RRC dedicated signaling, a HARQ feedback corresponding to PDSCH transmission on the SCell to be transmitted on a specified BWP (for example, the first BWP) belonging to a specified cell (for example, the cell to which the first BWP belongs). In other words, the cellIndex field and a bwpIndex field may be added to the RRC signaling. If the network device configures a plurality of PUCCH Scells, the network device may specifically indicate, in the RRC dedicated signaling by using the cellIndex field, a Cell on which the HARQ feedback corresponding to the PDSCH transmission on the SCell is transmitted, and indicate, by using the bwpIndex field, that the HARQ feedback is transmitted on a specified UL BWP belonging to the determined cell.

In one embodiment, an uplink carrier index (ulCarrierIndex) field may also be added to the RRC signaling, and the ulCarrierIndex field is used to indicate a carrier on which the BWP used to transmit the HARQ feedback corresponding to the PDSCH transmission is located.

In other words, when configuring one DL BWP, the network device configures, by using the RRC dedicated signaling, the HARQ feedback corresponding to the PDSCH transmission on the DL BWP to be transmitted on one UL BWP of a specified Cell, for example, the first BWP.

For example, the network device sends the RRC signaling to the terminal device, and the RRC signaling indicates that the HARQ feedback corresponding to the PDSCH transmission on a DL BWP 1 of an SCell 1 needs to be fed back on a UL BWP c of a PUCCH SCell x, where x represents a cell number, and c represents a BWP number. After receiving the RRC signaling, the terminal device sends, on the UL BWP c of the PUCCH SCell x, the HARQ feedback corresponding to the PDSCH transmission.

In one embodiment, in the second optional implementation, when the terminal device needs to perform the HARQ feedback on the UL BWP, the UL BWP also needs to be in an active state. Specifically, any one of the following manners may be used:

(1) The network device may send the BWP activation command to the terminal device, to ensure that all UL BWPs configured with PUCCHs are always in the active state. For specific descriptions of the BWP activation command, refer to the first optional implementation. Details are not described herein again.

(2) The terminal device activates the UL BWP. Specifically, in other words, after the terminal device receives the RRC signaling, the RRC signaling indicates a HARQ feedback for an SCell/DL BWP is performed on a specified UL BWP (for example, the first BWP) of a specified cell (for example, a first cell). If the SCell/DL BWP is activated, the terminal device automatically activates a corresponding UL BWP.

(3) The terminal device activates the UL BWP. Specifically, in other words, after receiving the DCI used for downlink scheduling, the terminal device determines that the HARQ feedback needs to be performed on a UL BWP, and the UL BWP is not activated, the terminal device activates the UL BWP. Alternatively, when the terminal device receives DCI scrambled by using a CS-RNTI, and the DCI is used to activate semi-persistent scheduling (SPS) configuration on the DL BWP, and a UL BWP corresponding to the DL BWP is not activated, the terminal device activates the UL BWP corresponding to the DL BWP.

Therefore, in the second optional implementation, the network device may indicate, in the RRC signaling, the first BWP in the first cell, so that the terminal device can transmit the HARQ feedback on the first BWP.

In a third optional implementation, the terminal device determines the first BWP by combining the configuration message and indication information.

In one embodiment, the configuration message may include the carrier index, and the carrier index is used to indicate the uplink carrier on which the first BWP is located. In one embodiment, the configuration message may include the cell information, and the cell information is used to indicate the cell to which the uplink carrier, on which the first BWP is located, belongs.

Herein, for a description of a scenario in which the configuration message needs to carry the carrier index and a description of a scenario in which the configuration message needs to carry the cell information, refer to the description in the first optional implementation. Details are not described herein.

For example, the configuration message is the RRC signaling, and the indication information is the DCI. The DCI may be used to indicate the first BWP. The RRC signaling may include the carrier index, and the carrier index is used to indicate an uplink carrier on which the first BWP is located. In one embodiment, the RRC signaling may further include the cell information, and the cell information is used to indicate the cell to which the uplink carrier, on which the first BWP is located, belongs.

Herein, the terminal device may determine the first BWP based on content of the DCI and content of the RRC signaling.

Specifically, the network device may add the cellIndex field to the RRC signaling, where the cellIndex field is used to indicate a specified Cell (for example, a PCell or a PUCCH SCell) on which the HARQ feedback corresponding to the PDSCH transmission on one SCell is transmitted. In one embodiment, if the network device configures a plurality of PUCCH SCells for the terminal device, the cellIndex field in the RRC signaling is used to specifically indicate a cell on which the HARQ feedback corresponding to the PDSCH transmission on the SCell is transmitted. In one embodiment, the cellIndex may be a cell index allocated by the network device for the terminal device when the network device configures a cell for the terminal device. In one embodiment, the uplink carrier index (ulCarrierIndex) field may be added to the RRC signaling or the DCI, and the ulCarrierIndex field is used to indicate a carrier on which the BWP used to transmit the HARQ feedback corresponding to the PDSCH transmission is located.

For example, when the network device configures a PUCCH SCell, an allocated cellIndex is x. For an SCell y whose cell number is y, the network device may add information about an SCell x to the RRC signaling, to indicate the terminal device to transmit, on a PUCCH resource of the SCell x, the HARQ feedback corresponding to the PDSCH transmission on the SCell y.

In one embodiment, the cellIndex may be an index value obtained after the PCell and all the PUCCH SCells are sorted in ascending/descending order of cell indexes. This is not specifically limited. For example, if the cellIndex is an index value obtained after the PCell and the PUCCH SCells are sorted in ascending order of cell indexes, and the network device configures the SCell x, the SCell y, and an SCell z as the PUCCH SCells (x<y<z), the cellIndex being 0 indicates the PCell, the cellIndex being 1 indicates the SCell x, the cellIndex being 2 indicates the SCell y, and the cellIndex being 3 indicates the SCell z.

After obtaining the cellIndex carried in the RRC signaling, the terminal device may learn of the information about the cell in which the HARQ feedback is transmitted. Further, the terminal device further needs to learn of a BWP that is of the cell and on which the HARQ feedback is transmitted. Herein, the terminal device may learn of information about the BWP via the DCI sent by the network device.

Specifically, the network device adds a ulBwpIndex field to the DCI used for downlink scheduling, where the ulBwpIndex field is used to indicate a UL BWP (for example, the first BWP) that is of the Cell (the Cell indicated in the RRC signaling) and on which the HARQ feedback corresponding to the PDSCH transmission in the scheduling is fed back. After receiving the DCI from the network device, the terminal device may identify, based on the content (for example, a carrier indicator field (CIF) and a BWP Index) of the DCI, a specific BWP on which the HARQ feedback is transmitted.

For example, if in the RRC signaling, the HARQ feedback corresponding to the PDSCH transmission on the DL BWP 1 of the SCell 1 is configured to be fed back on the PUCCH SCell x, UL BWPs a, b, c, and d are configured on the PUCCH SCell x, and the DCI received by the terminal device indicates that there is a PDSCH transmitted on the DL BWP 1 of the SCell 1 and ulBwpIndex=c, the terminal device may learn that the HARQ feedback corresponding to the PDSCH transmission needs to be transmitted on the UL BWP c of the PUCCH SCell x.

In the third optional implementation, if a plurality of uplink carriers, for example, the SUL carrier, are configured for a cell in which the HARQ feedback is performed, and each uplink carrier is configured with a PUCCH resource, the terminal device further needs to determine uplink carrier information when determining a location of the HARQ feedback corresponding to the PDSCH transmission. In this case, the uplink carrier information may be carried in the RRC signaling, or the uplink carrier information may be carried in the DCI.

Similarly, in the third optional implementation, when the terminal device needs to perform the HARQ feedback on the UL BWP, the UL BWP also needs to be in the active state. Specifically, any one of the following manners may be used:

(1) The network device may send a BWP activation command to the terminal device, to ensure that all UL BWPs configured with PUCCHs are always in an active state. For specific descriptions of the BWP activation command, refer to the first optional implementation. Details are not described herein again.

(2) After the terminal device receives the RRC signaling, the RRC signaling indicates a BWP on which the HARQ feedback is performed in the first cell. If the DL BWP in the first cell is in the active state, the terminal device automatically activates all UL BWPs, including the first BWP, that are configured with the PUCCH resources and that belong to the first cell.

(3) After receiving the DCI, if the terminal device learns that the HARQ feedback needs to be performed on the first BWP, and the first BWP is in an inactive state, the terminal device activates the first BWP.

Therefore, in the third optional implementation, the network device may include the cell information in the RRC signaling, and indicate the information about the first BWP in the DCI. Compared with the first optional implementation, signaling overheads are lower, so that the terminal device may determine the first BWP with reference to the RRC signaling and the DCI, and further transmit the HARQ feedback on the first BWP.

In a fourth optional implementation, S220 includes:

determining, by the terminal device, the first BWP based on the correspondence between the first BWP and the second BWP, where the correspondence is preset in the terminal device.

The foregoing correspondence may also be expressed in another manner, for example, a first preset rule, where the first preset rule is used to indicate that the HARQ feedback of the downlink information on the second BWP of a second cell is transmitted on the first BWP of the first cell. The first preset rule is predefined in a protocol. The first cell may be understood as a cell to which the first BWP belongs, and the second cell may be understood as a cell to which the second BWP belongs.

Compared with the third optional implementation, in the fourth optional implementation, the information about the first BWP may be determined in a manner of predefining in a protocol. In one embodiment, the configuration message may be RRC signaling. In other words, after obtaining information about the first cell via the RRC signaling, the terminal device obtains the information about the first BWP with reference to the rule (or the correspondence) predefined in the protocol, so as to perform the HARQ feedback on the first BWP of the first cell.

Herein, for information that is about the cell to which the first BWP belongs and that is carried in the RRC signaling, refer to the description in the third optional implementation. For brevity, details are not described herein again. The following describes in detail a possible implementation of the first preset rule with reference to a specific example.

For example, if the RRC signaling indicates that the HARQ feedback corresponding to the PDSCH transmission on a Cell x is transmitted on a Cell y, DL BWPs configured on the Cell x are sorted in ascending order of BWP indexes, and UL BWPs that are configured with PUCCH resources and that are on the Cell y are sorted in ascending order of BWP indexes. A UL BWP that is of the Cell y and on which the HARQ feedback corresponding to the PDSCH transmission on each DL BWP of the Cell x is transmitted may be determined in a polling manner.

Figure 4:
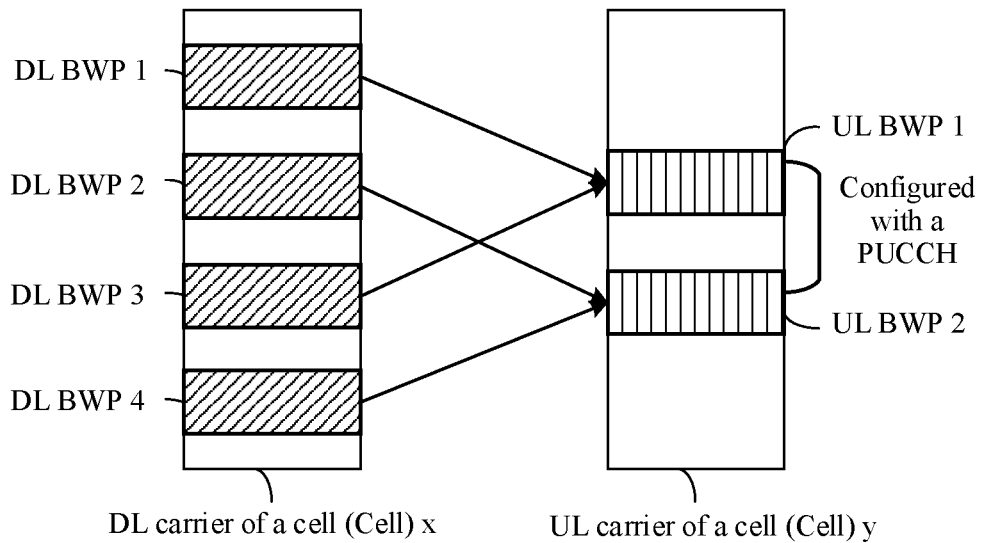
FIG. 4 is a schematic diagram of an example of a preset rule according to an embodiment of this application.

A preset rule in FIG. 4 is used as an example. The HARQ feedback corresponding to the PDSCH transmission on the Cell x is transmitted on an uplink carrier of the Cell y, a DL BWP 1, a DL BWP 2, a DL BWP 3, and a DL BWP 4 are configured on the Cell x, and a UL BWP 1 and a UL BWP 2 that are configured with PUCCH resources are configured on the Cell y. In this case, the first preset rule is defined in the polling manner as follows: HARQ feedbacks corresponding to the PDSCH transmission on the DL BWP 1 and the DL BWP 3 are transmitted on the UL BWP 1, and HARQ feedbacks corresponding to the PDSCH transmission on the DL BWP 2 and the DL BWP 4 are transmitted on the UL BWP 2. Alternatively (this case is not shown in FIG. 4), if the DL BWP 1, the DL BWP 2, the DL BWP 3, and the DL BWP 4 are configured on the Cell x, and the UL BWP 1, the UL BWP 2, the UL BWP 3, and the UL BWP 4 that are configured with PUCCH resources are configured on the Cell y, it may be defined as follows: The HARQ feedback corresponding to the PDSCH transmission on the DL BWP 1 is transmitted on the UL BWP 1, the HARQ feedback corresponding to the PDSCH transmission on the DL BWP 2 is transmitted on the UL BWP 2, the HARQ feedback corresponding to the PDSCH transmission on the DL BWP 3 is transmitted on the UL BWP 3, and the HARQ feedback corresponding to the PDSCH transmission on the DL BWP 4 is transmitted on the UL BWP 4.

Figure 5:
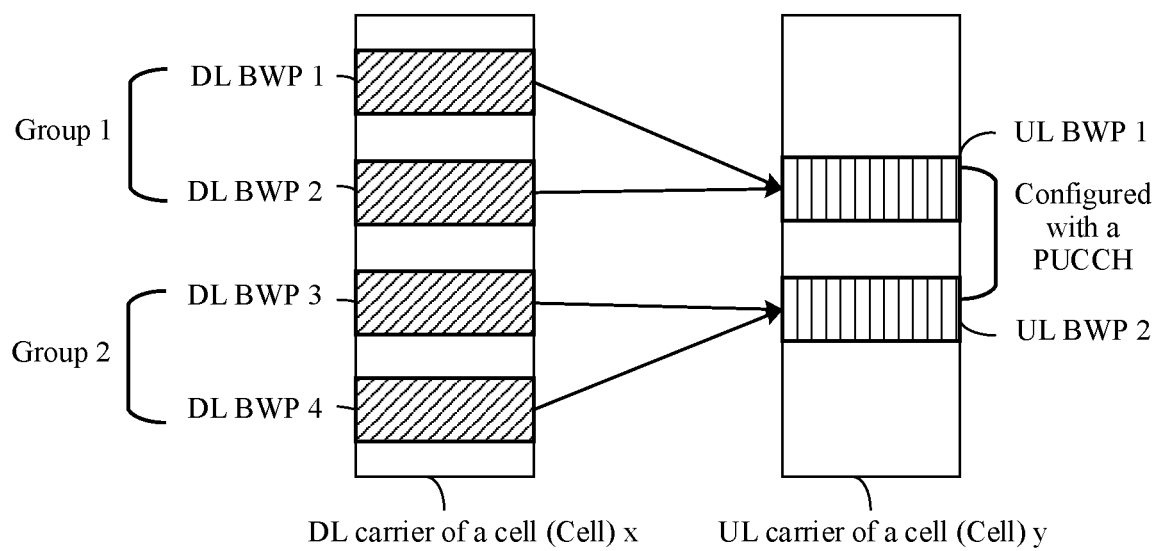
FIG. 5 is a schematic diagram of another example of a preset rule according to an embodiment of this application.

For another example, if the RRC signaling indicates that the HARQ feedback corresponding to the PDSCH transmission on the Cell x is transmitted on the Cell y, DL BWPs configured on the Cell x are sorted in ascending order of BWP indexes, and UL BWPs that are configured with PUCCH resources and that are on the Cell y are sorted in ascending order of BWP indexes. DL BWPs on the Cell x are grouped. Each group includes □m/n□ DL BWPs, where m is a quantity of DL BWPs configured on the Cell x, and n is a quantity of UL BWPs that are configured with PUCCHs and that are on the Cell y. Specifically, a UL BWP that is of the Cell y and on which the HARQ feedback corresponding to the PDSCH transmission on each group of DL BWPs of the Cell x is transmitted may be determined in a grouping manner. A preset rule in FIG. 5 is used as an example. The DL BWP 1, the DL BWP 2, the DL BWP 3, and the DL BWP 4 are configured on the Cell x, and the UL BWP 1 and the UL BWP 2 that are configured with PUCCH resources are configured on the Cell y. In this case, the first preset rule is defined in a grouping polling manner as follows: HARQ feedbacks corresponding to the PDSCH transmission on the DL BWP 1 and the DL BWP 2 are transmitted on the UL BWP 1, and HARQ feedbacks corresponding to the PDSCH transmission on the DL BWP 3 and the DL BWP 4 are transmitted on the UL BWP 2. In other words, the DL BWPs may be divided into two groups, and HARQ feedbacks corresponding to the PDSCH transmission on the two groups of DL BWPs are respectively transmitted on the UL BWP 1 and the UL BWP 2 in the polling manner.

In the fourth optional implementation, the RRC signaling may also include the carrier index.

Similarly, in the fourth optional implementation, when the terminal device needs to perform the HARQ feedback on a UL BWP, the UL BWP also needs to be in the active state. Herein, for a manner of activating the UL BWP, refer to the foregoing second optional implementation. For brevity, details are not described herein again.

It should be noted that in the fourth optional implementation, the first preset rule may be used to determine a configured or activated UL BWP on which a HARQ feedback of downlink information on a DL BWP configured or activated on a cell is transmitted. When the foregoing first preset rule is applied, and a UL BWP needs to be activated or deactivated, a UL BWP that is used for a HARQ feedback of downlink information on another DL BWP may change (for example, a deactivated UL BWP may be used for HARQ feedback of downlink information on another DL BWP). In this case, a new UL BWP may be immediately used to perform the HARQ feedback of downlink information on the another DL BWP, or a new UL BWP may be used to perform the HARQ feedback after a period of time defined in the protocol, so as to ensure that the HARQ feedback of downlink information on the another DL BWP is not affected.

Therefore, in the fourth optional implementation, the network device may carry the information about the cell to which the first BWP belongs in the RRC signaling, so that the terminal device may determine the first BWP with reference to the RRC signaling and the rule predefined in the protocol, and further transmit the HARQ feedback on the first BWP with minimum signaling overheads.

Various implementations of this embodiment of this application may be used in combination. For example, in this embodiment of this application, if the configuration message includes the cell information, the terminal device may obtain, according to the rule predefined in the protocol or based on the indication information, information used to indicate the first BWP. Alternatively, if the configuration message includes the information used to indicate the first BWP, the terminal device may obtain, according to rule predefined in the protocol or based on the indication information, the information used to indicate the cell to which the first BWP belongs.

In the foregoing four optional implementations, to avoid mutual impact between configuration resources used when the HARQ feedback is performed on different BWPs on a same uplink carrier, a corresponding HARQ process number may be configured for each BWP in this embodiment of this application, so that resources used on the BWPs to perform the HARQ feedback are independent of each other. Before the introduction, some concepts that may be used in the following are briefly described.

In the NR, a semi-persistent scheduling (SPS) configuration is supported for downlink. The SPS is configured per serving cell per BWP (per serving cell per BWP), to be specific, there is a maximum of one SPS configuration on a BWP. At most one SPS can be activated and used on a Cell. When an SPS resource arrives, a HARQ process ID associated with the SPS resource is calculated by using the following formula:

$$ID=[floor(CURRENT\_slot \times 10/(numberOfSlotsPerFrame \times semiPersistSchedIntervalDL))] modulo\ nrofHARQ\text{-}Process. \quad HARQ\ Process$$

In the foregoing formula, CURRENT_slot=[(SFN×numberOfSlotsPerFrame)+slot number in the frame], where the slot number in the frame indicates a number of a slot in which a resource is located in a radio frame. For example, a number of a first slot in a frame is 0. The numberOfSlotsPerFrame indicates a quantity of slots in one radio frame, a length of one radio frame is 10 ms, and one slot includes 14 symbols. For example, when a subcarrier spacing (SCS) of a cell carrier is 15 kHz, and a length of one slot is 1 ms, numberOfSlotsPerFrame=10. The nrofHARQ-Process indicates a quantity of available processes configured by using RRC for the SPS. Modulo is a modulo operation. The semiPersistSchedIntervalDL is a resource periodicity configured by RRC for the SPS. It can be learned that HARQ process IDs available for the SPS resources are 0, 1, . . . , and nrofHARQ-Process-1. It should be understood that for a specific meaning involved in the formula, refer to descriptions in the prior art.

In addition, a configured grant is introduced in the NR. The Configured grant is classified into two types: type 1 and type 2. In type 1, a periodical uplink resource is provided by using RRC signaling and can be used after being configured by using RRC signaling. In type 2, parameters such as a period and a quantity of available processes are configured by using RRC signaling, and the configured grant is activated by using a PDCCH command. An uplink resource is provided by the PDCCH command. The terminal device may periodically use the uplink resource based on the period parameter configured by using RRC signaling. In an existing NR technology, the Configured grant is configured per cell per BWP. In other words, there is at most one set of Configured grant configuration on one BWP. A maximum of one set of Configured grant can be activated and used on a Cell. When a Configured grant resource arrives, a HARQ process ID associated with the Configured grant resource is calculated by using the following formula:

HARQ Process ID=[floor(CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and periodicity and nrofHARQ-Processes are respectively a period and a quantity of available HARQ processes of the set of configured grant configured by using RRC signaling. It can be learned from the foregoing calculation formula of the HARQ process ID associated with the Configured grant resource that available HARQ process IDs of one set of configured grant resources are 0, 1, . . . , and nrofHARQ-Process-1. When the terminal device performs new transmission by using a configured grant, a timer, for example, a configuredGrantTimer (CG timer), is started for a HARQ process associated with the configured grant. When the timer runs, the HARQ process cannot perform new transmission by using the configured grant.

The foregoing describes a formula for calculating a HARQ process ID when one set of SPS/Configured grant resources are configured in the prior art. The following describes the solutions in the embodiments of this application with reference to the following cases.

Case 1: The method 200 further includes:

receiving, by the terminal device, a HARQ process parameter from the network device; and determining, by the terminal device based on the HARQ process parameter, a HARQ process number corresponding to the HARQ feedback.

In one embodiment, the configuration message may carry the HARQ process parameter (for example, a startProcessID parameter). In one embodiment, the configuration message may be RRC dedicated signaling.

In one embodiment, when configuring one set of SPS/Configured grant resources for the terminal device by using the RRC dedicated signaling, the network device may carry the startProcessID parameter in the RRC dedicated signaling. The terminal device may obtain the HARQ process number according to the startProcessID parameter and the nrofHARQ-Processes parameter. For example, available HARQ process numbers of the set of SPS/Configured grant resources are [startProcessID, startProcessID+nrofHARQ-Processes-1].

After one set of SPS/Configured grant resources are activated, the terminal device may obtain through calculation, by using the formula for calculating the HARQ process ID in the prior art, a harqProcessID associated with one set of SPS/Configured grant resource. In this case, an actual HARQ process number for processing the SPS/Configured grant resource is harqProcessID+startProcessID. When the finally determined HARQ process number exceeds a quantity of HARQ processes configured by using RRC signaling, that the determined HARQ process number modulo a maximum quantity of HARQ processes is processed, and an obtained result is an ID of a HARQ process used by the terminal device to process the SPS/Configured grant resource. For example, if the HARQ process number obtained through calculation is 13, but the RRC signaling configures that one HARQ entity of the terminal device can have only eight HARQ processes (that is, HARQ process numbers that can be used by the terminal device are 0, 1, 2, . . . , and 7), 13 module 8, and a result is 5. In this case, the terminal device processes the resource by using the HARQ process whose HARQ process number is 5.

For example, the network device configures the DL BWP 1 and the DL BWP 2 on the Cell x, and one set of SPS resource is configured on each of the two DL BWPs. If in the SPS configuration parameter on the DL BWP 1, the startProcessID is 0, the nrofHARQ-Processes parameter is 2; in the SPS configuration parameter on the DL BWP 2, the startProcessID is 2, and the nrofHARQ-Processes parameter is 2, it can be learned according to the formula [startProcessID, startProcessID+nrofHARQ-Processes-1] that:

HARQ process numbers available for the SPS on the DL BWP 1 are process 0 and process 1, and HARQ process numbers available for the SPS on the DL BWP 2 are process 2 and process 3. In this way, processes of different SPS configurations are not shared, thereby avoiding a problem that HARQ processes affect each other.

It should be noted that, if a plurality of sets of SPS/Configured grant resources are configured on one BWP, the foregoing method for determining the HARQ process number is still applicable. This is not limited.

Therefore, if different pre-configured resources are processed by using HARQ processes of a same HARQ entity, the method in the foregoing case 1 may be used. A HARQ parameter is carried in RRC signaling, and a HARQ process number is determined based on the HARQ parameter, to distinguish between HARQ processes, so that mutual impact between pre-configured resources during usage is avoided, and implementation complexity of the terminal device is low.

Case 2: The method 200 further includes:

determining, by the terminal device based on a predefined process parameter, the HARQ process number corresponding to the feedback information.

In one embodiment, the predefined process parameter may be a startProcessID parameter. In one embodiment, the predefined process parameter may be stored in the terminal device.

The foregoing predefined process parameter may be obtained according to a second preset rule defined in a protocol.

Specifically, the terminal device may determine, according to the second preset rule, the HARQ process number corresponding to the HARQ feedback, where the second preset rule is used to indicate a HARQ process number used when HARQ transmission is performed on the first BWP. In other words, the HARQ process number may be determined in a manner predefined in the protocol.

For example, the second preset rule indicates that the HARQ process number is determined by using the following formula: [startProcessID, startProcessID+nrofHARQ-Processes-1].

Specifically, for example, if the network device configures the DL BWP 1 and the DL BWP 2 on the Cell x, and one set of SPS resources is configured on each of the DL BWP 1 and the DL BWP 2, the nrofHARQ-Processes parameter in the SPS configuration parameter on the DL BWP 1 is 3, and the nrofHARQ-Processes parameter in the SPS configuration parameter on the DL BWP 2 is 2. If startProcessIDs corresponding to the SPS configurations on the DL BWP 1 and the DL BWP 2 respectively are 0 and 3 (where the startProcessIDs are obtained through calculation based on nrofHARQ-Processes corresponding to the SPS configured on BWPs), the foregoing formula of the second preset rule is used to calculate the HARQ process number, and it can be learned that HARQ process numbers available for the SPS on the DL BWP 1 are the process 0 and the process 2, and HARQ process numbers available for the SPS on the DL BWP 2 are the process 3 and the process 4. In this way, it is ensured that processes of different SPS configurations are not shared, and a problem that HARQ processes affect each other does not exist.

In one embodiment, if one BWP supports a plurality of sets of SPS/Configured grants, the second preset rule may be defined as follows: For an SPS/Configured grant on a BWP x, y is configured, and a corresponding startProcessID is a sum of nrofHARQ-Processes in the SPS/Configured grant configuration on all BWPs that are configured on the carrier and whose indexes are less than x and a sum of nrofHARQ-Processes in all SPS/Configured grant configurations that are configured on the BWP x and whose indexes are less than y. Herein, x represents a BWP number, and y represents a number of an SPS/Configured grant configured on a BWP.

Specifically, for example, the network device configures the DL BWP 1 and the DL BWP 2 on the Cell x, configures the SPS 1 and the SPS 2 on the DL BWP 1, and configures SPS 1 and SPS 2 (here, the SPS 1 indicates that the index of the SPS is 1, and the SPS 2 indicates that the index of the SPS is 2. The SPS indexes on different BWPs may be the same, and may correspond to different SPS configuration parameters) on the DL BWP 2. If the nrofHARQ-Processes parameter of each set of SPS configuration is 2, a startProcessID corresponding to the SPS 2 on the DL BWP 2 is 6, and available processes are HARQ process 6 and HARQ process 7.

In the foregoing example, a calculation process of the startProcessID corresponding to the SPS 2 on the DL BWP 2 is as follows: The SPS 1 and the SPS 2 are configured on the DL BWP 1, and nrofHARQ-Processes parameters of two sets of SPS configuration are both 2. According to the second preset rule, the startProcessID of the SPS 1 on the DL BWP 1 is 0, and available HARQ process IDs are 0 and 1; and the startProcessID of the SPS 2 on the DL BWP 2 is 2, and available HARQ process IDs are 2 and 3. The SPS 1 and the SPS 2 are also configured on the DL BWP 2, and the nrofHARQ-Processes parameters of the two sets of SPS configuration are both 2. According to the second preset rule, the startProcessID of the SPS 1 on the DL BWP 2 is a sum, that is, 4, of nrofHARQ-Processes corresponding to all SPS configured on all DL BWPs (only the DL BWP 1 in the example) whose indexes are less than 2; and the startProcessID of the SPS 2 on the DL BWP 2 is a sum of nrofHARQ-Processes corresponding to all SPS configured on the DL BWP1 and a sum of nrofHARQ-Processes corresponding to all SPS (only the SPS 1 herein) whose indexes are less than 2 on the DL BWP 2, that is, 6.

It should be understood that a value in the foregoing example may be another value, and the example herein does not constitute a limitation on the protection scope of the embodiments of this application.

Therefore, if different pre-configured resources are processed by using HARQ processes of a same HARQ entity, the method in the foregoing case 2 may be used to determine a HARQ process number in the manner predefined in the protocol, to distinguish between HARQ processes, thereby avoiding mutual impact between the pre-configured resources during usage. In addition, compared with case 1, load of RRC signaling in case 2 is relatively small.

It should be understood that various optional implementations of the embodiments of this application may be combined for use, and all methods obtained through combination fall within the protection scope of this application.

It should also be understood that the examples in FIG. 3 to FIG. 5 are provided merely to help a person skilled in the art understand the embodiments of this application, instead of limiting the embodiments of this application to specific scenarios shown in the examples. Definitely, a person skilled in the art can make various equivalent modifications or changes based on the examples shown in FIG. 3 to FIG. 5, and such modifications or changes also fall within the scope of the embodiments of this application.

In the prior art, when one carrier supports a plurality of activated BWPs, the terminal device does not know uplink and downlink BWPs on which a random access procedure is initiated. In view of this, an embodiment of this application further provides another communication method.

Figure 6:
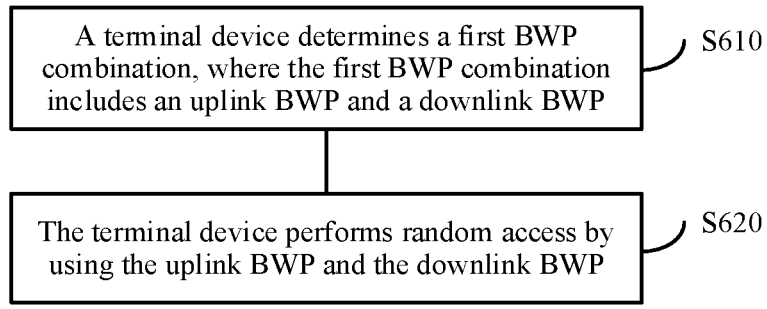
FIG. 6 is a schematic flowchart of a communication method according to another embodiment of this application.

FIG. 6 is a schematic flowchart of a communication method 600 according to another embodiment of this application. As shown in FIG. 6, the method 600 includes the following operations.

S610: A terminal device determines a first BWP combination, where the first BWP combination includes an uplink BWP and a downlink BWP.

S620: The terminal device performs random access by using the uplink BWP and the downlink BWP.

Specifically, in other words, the terminal device sends uplink information, for example, a random access preamble and a message Msg3 (there is no message 3 in non-contention-based random access), on the uplink BWP in the first BWP combination, and downlink information, for example, a message 2 and a message 4 (there is no message 4 in the non-contention-based random access mode), is sent on the downlink BWP in the first BWP combination.

In this embodiment of this application, the terminal device may select, from activated BWPs, an appropriate uplink BWP and downlink BWP to perform random access.

It should be noted that, if an association relationship (linkage) exists between the uplink BWP and the downlink BWP in the first BWP combination, and the uplink BWP and the downlink BWP are activated, the terminal device may select the uplink BWP and the downlink BWP to initiate the random access.

The terminal device determines the first BWP combination in a plurality of manners. For example, the terminal device may first determine whether there is an activated uplink BWP. If an uplink BWP is activated, the terminal device continues to determine whether a downlink BWP associated with the uplink BWP is activated. If the downlink BWP associated with the uplink BWP is also in an active state, the terminal device may select the BWP combination that includes the uplink BWP and the downlink BWP to perform random access.

Further, if the terminal device finds that a plurality of BWP combinations are in the active state, the terminal device may select the first BWP combination based on an index of a BWP, where an index corresponding to the first BWP combination is the largest or the smallest in the plurality of BWP combinations. The index of the BWP may be an index of an uplink BWP or an index of a downlink BWP.

For another example, if there are a plurality of BWP combinations, BWPs in each BWP combination are in the active state, and there is an association relationship between an uplink BWP and a downlink BWP in each BWP combination, the terminal device may randomly select, from the plurality of BWP combinations, one BWP combination to perform random access.

For another example, the terminal device first selects uplink BWPs and downlink BWPs that have association relationships, and then selects, from the uplink BWPs and the downlink BWPs, a combination in which both an uplink BWP and a downlink BWP are activated as the first BWP combination.

For another example, the terminal device may first determine whether there is an activated downlink BWP. If a downlink BWP is activated, the terminal device continues to determine whether an uplink BWP associated with the downlink BWP is activated. If the uplink BWP associated with the downlink BWP is also in the active state, the terminal device may select the BWP combination that includes the uplink BWP and the downlink BWP to perform random access.

In one embodiment, the terminal device may further select the first BWP combination based on a degree of density of access resource configuration on each BWP combination. The access resource refers to a physical random access channel (PRACH) resource. The degree of the density of the access resource configuration may be a quantity of PRACH occasions configured in one radio frame, or may be a quantity of PRACH occasions configured in another specified period of time. This is not specifically limited.

Herein, if an appropriate BWP combination cannot be selected based on the degree of the density of the access resource configuration, the foregoing other manners of determining the first BWP combination may be used. In other words, the manners may be used in combination. This is not specifically limited.

For example, if the access resources on the first BWP combination are the densest, the terminal device selects the first BWP combination to perform random access. In one embodiment, if there are a plurality of BWP combinations with a same degree of density, the terminal device may select a BWP combination in the foregoing manner (random selection or selection based on an index).

In one embodiment, in an embodiment, when there is no BWP combination in which both an uplink BWP and a downlink BWP are in an active state and are configured with an association relationship, the method 600 further includes:

selecting, by the terminal device, a first uplink BWP configured with an access resource, where the first uplink BWP is in an active state; and activating, by the terminal device, a first downlink BWP corresponding to the first uplink BWP.

In other words, if there is no BWP combination in which both an uplink BWP and a downlink BWP are in the active state and are configured with an association relationship, the terminal device may determine whether there is an uplink BWP configured with an access resource. If the terminal device determines that a first uplink BWP is in the active state and is configured with the access resource, the terminal device may select the first uplink BWP. In addition, the terminal device activates a first downlink BWP corresponding to the first uplink BWP, to obtain an appropriate BWP combination with this pair of the first uplink BWP and the first downlink BWP, that is, the first BWP combination, and then initiates random access by using the first BWP combination.

In one embodiment, if a plurality of activated first uplink BWPs are configured with access resources, the method 600 further includes:

randomly selecting, from the plurality of activated first uplink BWPs, one uplink BWP as the uplink BWP of the first BWP combination; or selecting the uplink BWP in the first BWP combination based on a BWP index, where the uplink BWP in the first BWP combination has a largest or the smallest BWP index in the plurality of first uplink BWPs.

In other words, if a plurality of activated uplink BWPs are configured with access resources, the terminal device may randomly select one uplink BWP as the uplink BWP (for example, the first uplink BWP) of the first BWP combination, or may select the uplink BWP in the first BWP combination based on a BWP index. This is not limited.

In one embodiment, in this embodiment, that a terminal device determines a first BWP combination includes:

selecting, by the terminal device, the first BWP combination based on a degree of density of access resource configuration on each of a plurality of BWP combinations.

In one embodiment, the terminal device may alternatively select to activate an initial UL/DL BWP to initiate the RACH.

Therefore, in this embodiment of this application, if there are a plurality of activated BWPs, the terminal device may select an appropriate UL/DL BWP to initiate random access.

It should be understood that a person skilled in the art may properly combine and use various optional implementations provided in the embodiments of this application. The implementations all fall within the protection scope of the embodiments of this application.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be further understood that, in the embodiments of this application, numbers "first", "second", and the like are introduced only to distinguish between different objects, for example, distinguish between different "BWPs", and do not constitute any limitation on the embodiments of this application.

An embodiment of this application further provides an apparatus for implementing any one of the foregoing methods. For example, the apparatus includes units (or means) configured to implement operations performed by the terminal in any one of the foregoing methods. For another example, another apparatus is further provided, including units (or means) configured to implement the operations performed by the network device in any one of the foregoing methods.

The foregoing describes in detail the communication method according to the embodiments of this application with reference to FIG. 1 to FIG. 6. The following describes a communications apparatus according to the embodiments of this application with reference to FIG. 7 to FIG. 12. It should be understood that the technical features described in the method embodiments are also applicable to the following apparatus embodiments.

Figure 7:
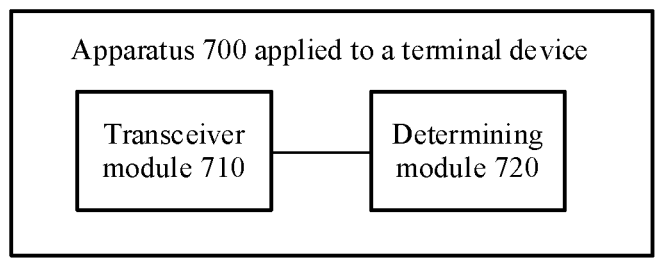
FIG. 7 is a schematic block diagram of a terminal device according to an embodiment of this application.

FIG. 7 is a schematic block diagram of an apparatus 700 applied to a terminal device according to an embodiment of this application. In one embodiment, the terminal device may include the apparatus 700. As shown in FIG. 7, the apparatus 700 includes:

a transceiver module 710, configured to receive a configuration message from a network device, where the configuration message is used to configure a plurality of uplink BWPs and a plurality of downlink BWPs;

a determining module 720, configured to determine a first BWP in the plurality of uplink BWPs, where the first BWP is used to transmit feedback information of downlink information that is on a second BWP, and the second BWP is any one of the plurality of downlink BWPs;

the transceiver module 710, further configured to receive the downlink information on the second BWP; and the transceiver module 710, further configured to send the feedback information of the downlink information by using the first BWP.

In one embodiment, the transceiver module 710 is further configured to:

receive indication information from the network device, where the indication information is used to indicate the first BWP; and the determining module 720 is configured to determine the first BWP based on the indication information.

In one embodiment, the indication information further includes a carrier index, and the carrier index is used to indicate a carrier on which the first BWP is located.

In one embodiment, the indication information further includes cell information, and the cell information is used to indicate a cell to which the carrier belongs.

In one embodiment, the configuration message includes a correspondence between the first BWP and the second BWP, and the determining module 720 is configured to determine the first BWP based on the correspondence.

In one embodiment, the determining module 720 is configured to determine the first BWP based on the correspondence between the first BWP and the second BWP, where the correspondence is preset in the apparatus.

In one embodiment, the configuration message includes the carrier index, and the carrier index is used to indicate the carrier on which the first BWP is located.

In one embodiment, the configuration message further includes the cell information, and the cell information is used to indicate the cell to which the carrier belongs.

In one embodiment, the apparatus 700 further includes an activating module, configured to activate the first BWP.

In one embodiment, the transceiver module 710 is further configured to receive an activation indication from the network device, where the activation indication is used to indicate to activate the first BWP, and the activating module is configured to activate the first BWP based on the activation indication.

In one embodiment, the transceiver module 710 is further configured to receive a HARQ process parameter from the network device; and the determining module 720 is configured to determine, based on the HARQ process parameter, a HARQ process number corresponding to the feedback information.

In one embodiment, the determining module 720 is configured to determine, based on a predefined process parameter, a HARQ process number corresponding to the feedback information.

It should be understood that the apparatus 700 according to this embodiment of this application may correspond to the method on a terminal device side in the foregoing method embodiments (including FIG. 2 to FIG. 5), and the foregoing and other management operations and/or functions of the modules in the apparatus 700 are respectively used to implement corresponding operations of the foregoing methods. Therefore, beneficial effects in the foregoing method embodiments may also be implemented. For brevity, details are not described herein again.

Figure 8:
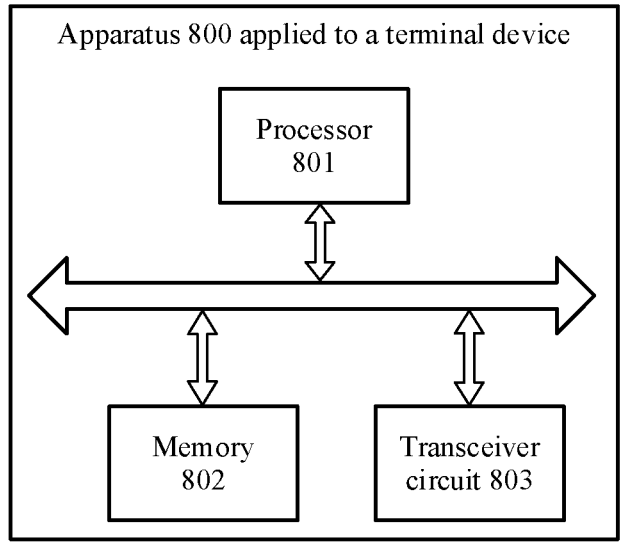
FIG. 8 is a schematic structural diagram of a terminal device according to an embodiment of this application.

FIG. 8 is a schematic structural diagram of an apparatus 800 applied to a terminal device according to an embodiment of this application. In one embodiment, the terminal device may include the apparatus 800. As shown in FIG. 8, the apparatus 800 includes:

a processor 801, a memory 802, and a transceiver circuit 803.

The processor 801, the memory 802, and the transceiver circuit 803 communicate with each other through an internal connection path, to transfer a control and/or data signal. In a possible design, the processor 801, the memory 802, and the transceiver circuit 803 may be implemented by a chip. The memory 802 may store program code, and the processor 801 invokes the program code stored in the memory 802, to implement a corresponding function of the terminal device.

The transceiver circuit 803 is configured to receive a configuration message from a network device, where the configuration message is used to configure a plurality of uplink BWPs and a plurality of downlink BWPs.

The processor 801 is configured to determine a first BWP in the plurality of uplink BWPs, where the first BWP is used to transmit feedback information of downlink information that is on a second BWP, and the second BWP is any one of the plurality of downlink BWPs.

The transceiver circuit 803 is further configured to: receive the downlink information on the second BWP, and send the feedback information of the downlink information by using the first BWP.

In one embodiment, the transceiver module 710 in the apparatus 700 shown in FIG. 7 may correspond to the transceiver circuit 803 in the apparatus 800 shown in FIG. 8, and the determining module 720 may correspond to the processor 801 in the apparatus 800 shown in FIG. 8.

The transceiver module or the transceiver circuit is an interface circuit of the apparatus, and is configured to receive a signal from another apparatus or send a signal to another apparatus. For example, when the apparatus is implemented in a chip manner, the transceiver module or the transceiver circuit is an interface circuit that is of the chip and that is configured to receive a signal from another chip or apparatus or send a signal to another chip or apparatus.

In this embodiment of this application, the apparatus 700 may be a chip (or a chip system) installed in the terminal device. In this case, the apparatus 700 may include a processor and an input/output interface. The processor may be communicatively connected to a transceiver of the network device through the input/output interface. In one embodiment, the apparatus further includes a memory, where the memory is communicatively connected to the processor. In one embodiment, the processor, the memory, and the transceiver circuit may be communicatively connected. The memory may be configured to store an instruction. The processor is configured to execute the instruction stored in the memory, to control the transceiver circuit to send information or a signal.

It should be understood that the apparatus 800 according to this embodiment of this application may correspond to the method on the terminal device side in the foregoing method embodiments.

Figure 9:
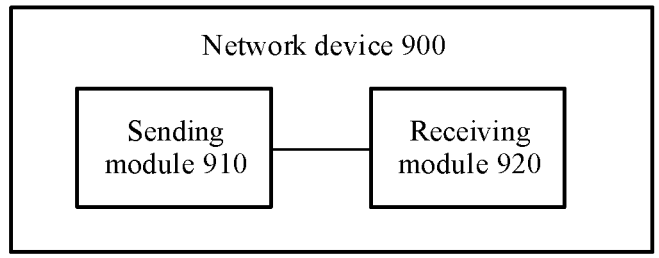
FIG. 9 is a schematic block diagram of a network device according to an embodiment of this application.

FIG. 9 is a schematic block diagram of a network device 900 according to an embodiment of this application. As shown in FIG. 9, the network device 900 includes:

a sending module 910, configured to send a configuration message to a terminal device, where the configuration message is used to configure a plurality of uplink BWPs and a plurality of downlink BWPs, and the plurality of uplink BWPs are used by the terminal device to determine a first BWP;

the sending module 910, further configured to send downlink information to the terminal device by using a second BWP, where the second BWP is any one of the plurality of downlink BWPs; and a receiving module 920, configured to receive feedback information that is of the downlink information and that is sent by the terminal device by using the first BWP, where the first BWP is a BWP in the plurality of uplink BWPs.

In one embodiment, the sending module 910 is further configured to:

send indication information to the terminal device, where the indication information is used to indicate the first BWP.

In one embodiment, the indication information further includes a carrier index, and the carrier index is used to indicate a carrier on which the first BWP is located.

In one embodiment, the indication information further includes cell information, and the cell information is used to indicate a cell to which the carrier belongs.

In one embodiment, the configuration message includes a correspondence between the first BWP and the second BWP, and the correspondence is used by the terminal device to determine the first BWP.

In one embodiment, the configuration message includes the carrier index, and the carrier index is used to indicate the carrier on which the first BWP is located.

In one embodiment, the configuration message further includes the cell information, and the cell information is used to indicate the cell to which the carrier belongs.

In one embodiment, the sending module 910 is further configured to:

send an activation indication to the terminal device, where the activation indication is used to indicate the terminal device to activate the first BWP.

In one embodiment, the sending module 910 is further configured to:

send a HARQ process parameter to the terminal device, where the HARQ process parameter is used by the terminal device to determine a HARQ process number corresponding to the feedback information.

It should be understood that the network device 900 according to this embodiment of this application may correspond to the method on a network device side in the foregoing method embodiments (including FIG. 2 to FIG. 5), and the foregoing and other management operations and/or functions of the modules in the network device 900 are respectively used to implement corresponding operations of the foregoing methods. Therefore, beneficial effects in the foregoing method embodiments may also be implemented. For brevity, details are not described herein again.

Figure 10:
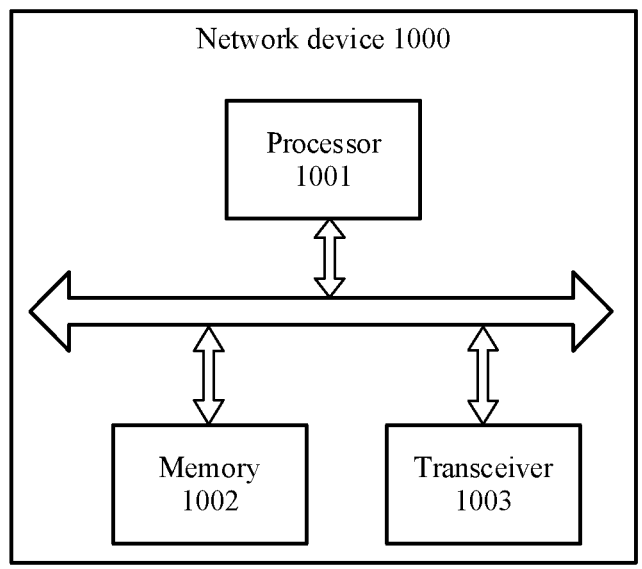
FIG. 10 is a schematic structural diagram of a network device according to an embodiment of this application.

FIG. 10 is a schematic structural diagram of a network device 1000 according to an embodiment of this application. As shown in FIG. 10, the network device 1000 includes:

a processor 1001, a memory 1002, and a transceiver 1003.

The processor 1001, the memory 1002, and the transceiver 1003 communicate with each other through an internal connection path, to transfer a control and/or data signal. In a possible design, the processor 1001, the memory 1002, and the transceiver 1003 may be implemented by a chip. The memory 1002 may store program code, and the processor 1001 invokes the program code stored in the memory 1002, to implement a corresponding function of the network device.

The transceiver 1003 is configured to send a configuration message to a terminal device, where the configuration message is used to configure a plurality of uplink BWPs and a plurality of downlink BWPs, and the plurality of uplink BWPs are used by the terminal device to determine a first BWP.

The transceiver 1003 is further configured to send downlink information to the terminal device by using a second BWP, where the second BWP is any one of the plurality of downlink BWPs; and is further configured to receive feedback information that is of the downlink information and that is sent by the terminal device by using the first BWP.

In one embodiment, the sending module 910 and the receiving module 920 in the network device 900 shown in FIG. 9 may also correspond to the transceiver 1003 in the network device 1000 shown in FIG. 10. In another implementation, the transceiver may be implemented by two components: a receiver (corresponding to the receiving module 920) and a transmitter (corresponding to the sending module 920).

In this embodiment of this application, the network device 900 may be a chip (or a chip system) installed in a network device. In this case, the network device 900 may include a processor and an input/output interface. The processor may be communicatively connected to a transceiver of the network device through the input/output interface. In one embodiment, the apparatus further includes a memory, where the memory is communicatively connected to the processor. In one embodiment, the processor, the memory, and the transceiver may be communicatively connected. The memory may be configured to store an instruction. The processor is configured to execute the instruction stored in the memory, to control the transceiver to send information or a signal.

It should be understood that the network device 1000 according to this embodiment of this application may correspond to the method on the network device side in the foregoing method embodiments.

Figure 11:
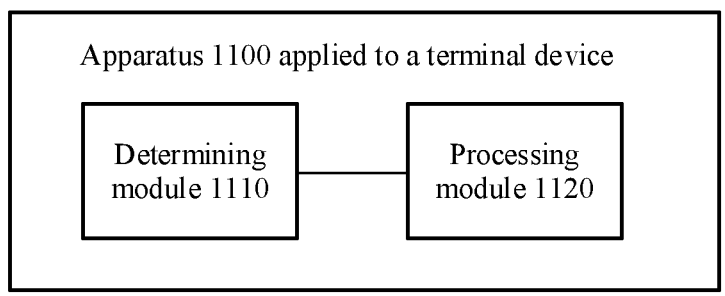
FIG. 11 is a schematic block diagram of a terminal device according to another embodiment of this application.

FIG. 11 is a schematic block diagram of an apparatus 1100 applied to a terminal device according to an embodiment of this application. In one embodiment, the terminal device may include the apparatus 1100. As shown in FIG. 11, the apparatus 1100 includes:

a determining module 1110, configured to determine a first BWP combination, where the first BWP combination includes an uplink BWP and a downlink BWP; and a processing module 1120, configured to perform random access by using the uplink BWP and the downlink BWP.

In one embodiment, the uplink BWP and the downlink BWP that are in the first BWP combination are in an active state, and the uplink BWP and the downlink BWP that are in the first BWP combination are configured with an association relationship.

In one embodiment, when there is no BWP combination in which both an uplink BWP and a downlink BWP are in an active state and are configured with an association relationship, the processing module 1120 is further configured to:

select a first uplink BWP configured with an access resource, where the first uplink BWP is in the active state; and activate a first downlink BWP corresponding to the first uplink BWP.

In one embodiment, if there are a plurality of activated first uplink BWPs, the processing module is further configured to:

randomly select, from the plurality of activated first uplink BWPs, one uplink BWP as the uplink BWP of the first BWP combination; or select the uplink BWP in the first BWP combination based on a BWP index, where the uplink BWP in the first BWP combination has a largest or smallest BWP index in the plurality of activated first uplink BWPs.

In one embodiment, the determining module 1110 is configured to:

select the first BWP combination based on a degree of density of access resource configuration on each of a plurality of BWP combinations.

It should be understood that the apparatus 1100 according to this embodiment of this application may correspond to the method of the terminal device in the foregoing method embodiment (for example, FIG. 6), and the foregoing and other management operations and/or functions of the modules in the apparatus 1100 are respectively used to implement corresponding operations of the foregoing methods. Therefore, beneficial effects in the foregoing method embodiment may also be implemented. For brevity, details are not described herein again.

Figure 12:
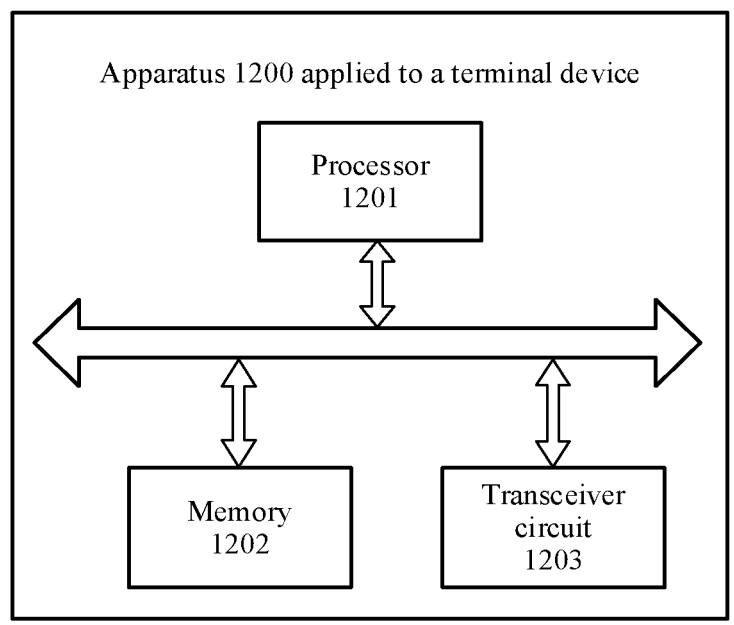
FIG. 12 is a schematic structural diagram of a terminal device according to another embodiment of this application.

FIG. 12 is a schematic structural diagram of an apparatus 1200 applied to a terminal device according to an embodiment of this application. In one embodiment, the terminal device may include the apparatus 1200. As shown in FIG. 12, the apparatus 1200 includes:

a processor 1201, a memory 1202, and a transceiver circuit 1203.

The processor 1201, the memory 1202, and the transceiver circuit 1203 communicate with each other through an internal connection path, to transfer a control and/or data signal. In a possible design, the processor 1201, the memory 1202, and the transceiver circuit 1203 may be implemented by a chip. The memory 1202 may store program code, and the processor 1201 invokes the program code stored in the memory 1202, to implement a corresponding function of the terminal device.

The processor 1201 is configured to determine a first BWP combination, where the first BWP combination includes an uplink BWP and a downlink BWP, and is further configured to perform random access by using the uplink BWP and the downlink BWP.

In one embodiment, the determining module 1110 and the processing module 1120 in the apparatus 1100 shown in FIG. 11 may correspond to the processor 1201 in the apparatus 1200 shown in FIG. 12.

The transceiver module or the transceiver circuit is an interface circuit of the apparatus, and is configured to receive a signal from another apparatus or send a signal to another apparatus. For example, when the apparatus is implemented in a chip manner, the transceiver module or the transceiver circuit is an interface circuit that is of the chip and that is configured to receive a signal from another chip or apparatus or send a signal to another chip or apparatus.

In this embodiment of this application, the apparatus 1100 may be a chip (or a chip system) installed in the terminal device. In this case, the apparatus 1100 may include a processor and an input/output interface. The processor may be communicatively connected to a transceiver of the network device through the input/output interface. In one embodiment, the apparatus further includes a memory, where the memory is communicatively connected to the processor. In one embodiment, the processor, the memory, and the transceiver circuit may be communicatively connected. The memory may be configured to store an instruction. The processor is configured to execute the instruction stored in the memory, to control the transceiver circuit to send information or a signal.

It should be understood that the apparatus 1200 according to this embodiment of this application may correspond to the method on the terminal device side in the foregoing method embodiments.

The method disclosed in the embodiments of this application may be applied to a processor or may be implemented by a processor. The processor may be an integrated circuit chip and has a signal processing capability. In an implementation process, operations in the foregoing method embodiments may be implemented by using a hardware integrated logic circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate, a transistor logic device, a discrete hardware component, a system on chip (SoC), a central processing unit (CPU), a network processor (NP), a digital signal processing circuit (DSP), a micro controller unit (MCU), a programmable controller (PLD), or another integrated chip. The methods, the operations, and logic block diagrams that are disclosed in the embodiments of this application may be implemented or performed. The general purpose processor may be a microprocessor, or the processor may be any conventional processor or the like. The operations of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that, in the embodiments of this application, the memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate-synchronous dynamic random access memory (double Data Rate SDRAM, DDR SDRAM), an enhanced synchronous dynamic random access memory (enhanced SDRAM, ESDRAM), a synchlink dynamic random access memory (synchronous link DRAM, SLDRAM), and a direct rambus random access memory (direct rambus RAM, DR RAM). It should be noted that memories in the system and method described in this specification include but are not limited to the memories and memories of any other proper types.

Figure 13:
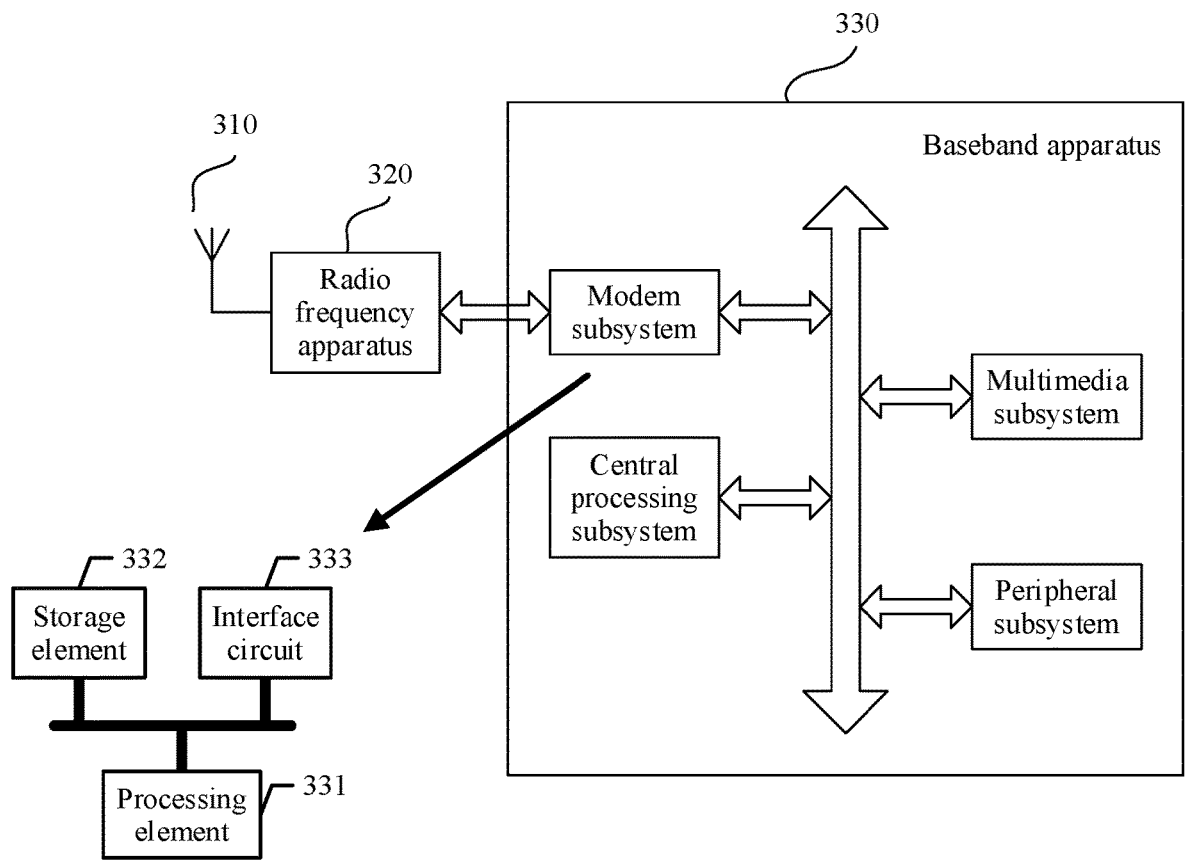
FIG. 13 is a structural block diagram of a terminal device according to another embodiment of this application.

An embodiment of this application further provides a terminal. FIG. 13 is a schematic structural diagram of a terminal according to an embodiment of this application. The terminal may be the terminal device in the foregoing embodiments, and may be configured to implement operations of the terminal device in the foregoing embodiments. As shown in FIG. 13, the terminal includes an antenna 310, a radio frequency part 320, and a signal processing part 330. The antenna 310 is connected to the radio frequency part 320. In a downlink direction, the radio frequency part 320 receives, via the antenna 310, information sent by a network device, and sends, to the signal processing part 330, the information sent by the network device for processing. In an uplink direction, the signal processing part 330 processes the information of the terminal, and sends the information of the terminal to the radio frequency part 320. The radio frequency part 320 processes the information of the terminal, and then sends the processed information of the terminal to the network device via the antenna 310.

The signal processing part 330 may include a modem subsystem, configured to process data at each communications protocol layer. The signal processing part 330 may further include a central processing subsystem, configured to implement processing of an operating system and an application layer of the terminal. In addition, the signal processing part 330 may further include another subsystem, for example, a multimedia subsystem or a peripheral subsystem. The multimedia subsystem is configured to control a camera or a screen display of the terminal, and the peripheral subsystem is configured to implement a connection to another device. The modem subsystem may be a separately disposed chip. In one embodiment, the foregoing apparatus applied to a terminal may be located in the modem subsystem.

The modem subsystem may include one or more processing elements 331, for example, include a main control CPU and another integrated circuit. In addition, the modem subsystem may further include a storage element 332 and an interface circuit 333. The storage element 332 is configured to store data and a program. However, the program used to perform the methods performed by the terminal in the foregoing methods may not be stored in the storage element 332, but is stored in a memory outside the modem subsystem, and is loaded and used by the modem subsystem when to be used. The interface circuit 333 is configured to communicate with another subsystem. The foregoing apparatus used for the terminal may be located in the modem subsystem. The modem subsystem may be implemented by using a chip. The chip includes at least one processing element and an interface circuit. The processing element is configured to perform the operations of any method performed by the terminal. The interface circuit is configured to communicate with another apparatus. In an embodiment, units of the terminal that implement the operations in the foregoing methods may be implemented by a processing element scheduling a program. For example, the apparatus used for the terminal includes a processing element and a storage element. The processing element invokes a program stored in the storage element, to perform the methods performed by the terminal in the foregoing method embodiments. The storage element may be a storage element whose processing element is located on a same chip, that is, an on-chip storage element.

In another embodiment, the program used to perform the methods performed by the terminal in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal in the foregoing method embodiments.

In still another embodiment, units of the terminal that implement the operations in the foregoing methods may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. The integrated circuits may be integrated together to form a chip.

Units of the terminal that implement the operations in the foregoing methods may be integrated together, and implemented in a form of a system-on-a-chip (SOC). The SOC chip is configured to implement the foregoing methods. At least one processing element and a storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units are implemented by a processing element invoking a program, and functions of some units are implemented by an integrated circuit.

It can be learned that the foregoing apparatus used for the terminal may include at least one processing element and an interface circuit. The at least one processing element is configured to perform any method performed by the terminal provided in the foregoing method embodiments. The processing element may perform some or all operations performed by the terminal in the foregoing method embodiments, in a first manner, to be specific, by executing the program stored in the storage element; or may perform, some or all operations performed by the terminal in the foregoing method embodiments, in a second manner, to be specific, by using the hardware integrated logical circuit in the processor element in combination with instructions; or may certainly perform, by combining the first manner and the second manner, some or all operations performed by the terminal in the foregoing method embodiments.

As described above, the processing element herein may be a general purpose processor, for example, a CPU, or may be one or more integrated circuits configured to implement the foregoing methods, for example, one or more ASICs, one or more micro processors DSPs, or one or more FPGAs, or a combination of at least two of the integrated circuit forms.

The storage element may be a memory, or may be a general name of a plurality of storage elements.

Figure 14:
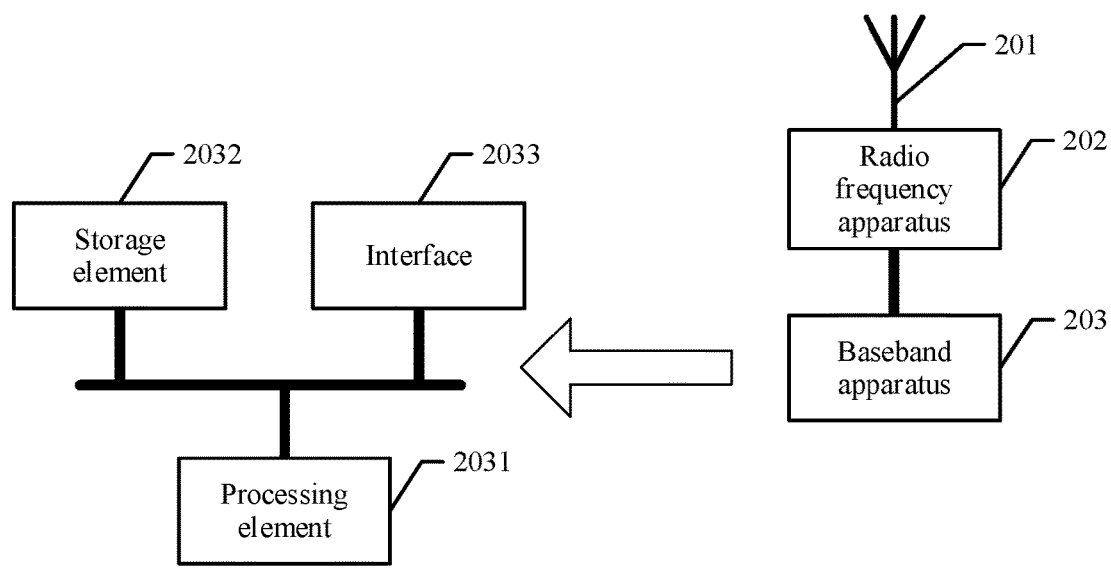
FIG. 14 is a structural block diagram of a network device according to another embodiment of this application.

An embodiment of this application further provides a network device. FIG. 14 is a schematic structural diagram of a network device according to an embodiment of this application. The network device is configured to implement operations of the network device in the foregoing embodiments. As shown in FIG. 14, the network device includes an antenna 201, a radio frequency apparatus 202, and a baseband apparatus 203. The antenna 201 is connected to the radio frequency apparatus 202. In an uplink direction, the radio frequency apparatus 202 receives, via the antenna 201, information sent by a terminal, and sends, to the baseband apparatus 203, the information sent by the terminal for processing. In a downlink direction, the baseband apparatus 203 processes information for the terminal, and sends the information for the terminal to the radio frequency apparatus 202. The radio frequency apparatus 202 processes the information for the terminal, and then sends the processed information for the terminal to the terminal via the antenna 201.

The baseband apparatus 203 may include one or more processing elements 2031, for example, include a main control CPU and another integrated circuit. In addition, the baseband apparatus 203 may further include a storage element 2032 and an interface 2033. The storage element 2032 is configured to store a program and data. The interface 2033 is configured to exchange information with the radio frequency apparatus 202, and the interface is, for example, a common public radio interface (CPRI). The foregoing apparatus used for the network device may be located in the baseband apparatus 203. For example, the foregoing apparatus used for the network device may be a chip in the baseband apparatus 203. The chip includes at least one processing element and an interface circuit. The processing element is configured to perform the operations of any method performed by the network device. The interface circuit is configured to communicate with another apparatus. In an embodiment, units of the network device that implement the operations in the foregoing methods may be implemented by a processing element scheduling a program. For example, the apparatus used for the network device includes a processing element and a storage element. The processing element invokes a program stored in the storage element, to perform the methods performed by the network device in the foregoing method embodiments. The storage element may be a storage element that is located on a same chip as the processing element, that is, an on-chip storage element, or may be a storage element that is located on a different chip from the processing element, that is, an off-chip storage element.

In another embodiment, units of the network device that implement the operations in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. The integrated circuits may be integrated together to form a chip.

Units of the network device that implement the operations in the foregoing methods may be integrated together, and implemented in a form of a system-on-a-chip (SOC). For example, the baseband apparatus includes the SOC chip, configured to implement the foregoing methods. At least one processing element and a storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units are implemented by a processing element invoking a program, and functions of some units are implemented by an integrated circuit.

It can be learned that the foregoing apparatus used for the network device may include at least one processing element and an interface circuit. The at least one processing element is configured to perform any method performed by the network device provided in the foregoing method embodiments. The processing element may perform some or all operations performed by the network device, in a first manner, to be specific, by executing the program stored in the storage element; or may perform, some or all operations performed by the network device, in a second manner, to be specific, by using the hardware integrated logical circuit in the processor element in combination with instructions; or may certainly perform, by combining the first manner and the second manner, some or all operations performed by the network device.

As described above, the processing element herein may be a general purpose processor, for example, a CPU, or may be one or more integrated circuits configured to implement the foregoing methods, for example, one or more ASICs, one or more micro processors DSPs, or one or more FPGAs, or a combination of at least two of the integrated circuit forms.

The storage element may be a memory, or may be a general name of a plurality of storage elements.

A person of ordinary skill in the art may be aware that units and algorithm operations in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device, a configuration message from a network device, wherein the configuration message configures a plurality of uplink bandwidth parts (BWPs) that are active for the terminal device and a plurality of downlink BWPs that are active for the terminal device;
   determining, by the terminal device, a first BWP in the plurality of uplink BWPs to transmit feedback information of downlink information that is on a second BWP in the plurality of downlink BWPs, wherein determining the first BWP comprises determining the first BWP according to a grouping rule in which a first group of the plurality of downlink BWPs including the second BWP are associated with the first BWP of the plurality of uplink BWPs for feedback information associated with the first group and a second group of the plurality of downlink BWPs are associated with a third BWP of the plurality of uplink BWPs for feedback information associated with the second group;
   receiving, by the terminal device, the downlink information on the second BWP; and
   sending, by the terminal device, the feedback information of the downlink information on the first BWP.

2. The method according to claim 1, further comprising:
   receiving, by the terminal device, indication information from the network device, wherein the indication information indicates the first BWP to be used to send the feedback information; and
   wherein determining the first BWP in the plurality of uplink BWPs comprises:
   determining, by the terminal device, the first BWP based on the indication information.

3. The method according to claim 2, wherein the indication information further comprises a carrier index, and wherein the carrier index indicates a carrier on which the first BWP to be used to send the feedback information is located.

4. The method according to claim 3, wherein the indication information further comprises cell information, and wherein the cell information indicates a cell to which the carrier belongs.

5. The method according to claim 1, wherein determining the first BWP in the plurality of uplink BWPs comprises:
   determining, by the terminal device, the first BWP to be used to send the feedback information based on a correspondence between the first BWP and the second BWP, wherein the correspondence is included in the configuration message, or the correspondence is preset in the terminal device.

6. The method according to claim 1, wherein the configuration message comprises a carrier index, and wherein the carrier index indicates a carrier on which the first BWP to be used to send the feedback information is located.

7. The method according to claim 6, wherein the configuration message further comprises cell information, and wherein the cell information indicates a cell to which the carrier belongs.

8. The method according to claim 1, wherein before sending the feedback information of the downlink information on the first BWP, the method further comprises:
   activating, by the terminal device, the first BWP.

9. The method according to claim 8, further comprising:
   receiving, by the terminal device, an activation indication from the network device comprising a bitmap corresponding to the first BWP to be used to send the feedback information, wherein the activation indication indicates to activate the first BWP; and
   wherein activating the first BWP comprises:
   activating, by the terminal device, the first BWP based on the activation indication.

10. The method according to claim 1, further comprising:
    receiving, by the terminal device, a HARQ process parameter from the network device; and
    determining, by the terminal device based on the HARQ process parameter, a HARQ process number corresponding to the feedback information.

11. An apparatus, comprising at least one processor, configured to invoke a program stored in a memory, wherein the program, when executed by the processor, causes the apparatus to perform:
    receiving a configuration message from a network device, wherein the configuration message configures a plurality of uplink bandwidth parts (BWPs) that are active for the apparatus and a plurality of downlink BWPs that are active for the apparatus;
    determining a first BWP in the plurality of uplink BWPs to transmit feedback information of downlink information that is on a second BWP in the plurality of downlink BWPs, wherein determining the first BWP comprises determining the first BWP according to a grouping rule in which a first group of the plurality of downlink BWPs including the second BWP are associated with the first BWP of the plurality of uplink BWPs for feedback information associated with the first group and a second group of the plurality of downlink BWPs are associated with a third BWP of the plurality of uplink BWPs for feedback information associated with the second group;

receiving the downlink information on the second BWP; and sending the feedback information of the downlink information on the first BWP.

12. The apparatus according to claim 11, wherein the program, when executed by the processor, further causes the apparatus to perform:

receive indication information from the network device, wherein the indication information indicates the first BWP to be used to send the feedback information, wherein the first BWP is determined based on the indication information.

13. The apparatus according to claim 12, wherein the indication information further comprises a carrier index, and wherein the carrier index indicates a carrier on which the first BWP to be used to send the feedback information is located.

14. The apparatus according to claim 13, wherein the indication information further comprises cell information, and wherein the cell information indicates a cell to which the carrier belongs.

15. The apparatus according to claim 11, wherein the program, when executed by the processor, causes the apparatus to perform:

determining the first BWP based on a correspondence between the first BWP to be used to send the feedback information and the second BWP, wherein the correspondence is included in the configuration message, or the correspondence is preset in the apparatus.

16. The apparatus according to claim 11, wherein the configuration message comprises a carrier index, and wherein the carrier index indicates a carrier on which the first BWP to be used to send the feedback information is located.

17. The apparatus according to claim 16, wherein the configuration message further comprises cell information, and wherein the cell information indicates a cell to which the carrier belongs.

18. The apparatus according to claim 11, the program, when executed by the processor, causes the apparatus to further perform:

activating the first BWP.

19. The apparatus according to claim 18, the program, when executed by the processor, causes the apparatus further to perform:

receiving an activation indication from the network device, wherein the activation indication comprises a bitmap corresponding to the first BWP to be used to send the feedback information and indicates to activate the first BWP, and wherein the first BWP is activated based on the activation indication.

20. An apparatus, comprising at least one processor, configured to invoke a program stored in a memory, wherein the program, when executed by the processor, causes the apparatus to perform:

sending a configuration message to a terminal device, wherein the configuration message configures a plurality of uplink bandwidth parts (BWPs) that are active for the terminal device and a plurality of downlink BWPs that are active for the terminal device, and wherein the configuration message configures a first BWP of the plurality of uplink BWPs according to a grouping rule in which a first group of the plurality of downlink BWPs including a second BWP are associated with the first BWP of the plurality of uplink BWPs for feedback information associated with the first group and a second group of the plurality of downlink BWPs are associated with a third BWP of the plurality of uplink BWPs for feedback information associated with the second group;

sending downlink information to the terminal device on the second BWP in the plurality of downlink BWPs; and receiving, on a first BWP in the plurality of uplink BWPs, feedback information of the downlink information from the terminal device.

* * * * *